(12) United States Patent
Eck et al.

(10) Patent No.: US 10,268,686 B2
(45) Date of Patent: Apr. 23, 2019

(54) MACHINE TRANSLATION SYSTEM EMPLOYING CLASSIFIER

(71) Applicant: Facebook, Inc., Menlo Park, CA (US)

(72) Inventors: Matthias Gerhard Eck, San Francisco, CA (US); Priya Goyal, Kurukshetra (IN)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/192,170

(22) Filed: Jun. 24, 2016

(65) Prior Publication Data
US 2017/0371870 A1  Dec. 28, 2017

(51) Int. Cl.
*G06F 17/27* (2006.01)
*G06F 17/28* (2006.01)

(52) U.S. Cl.
CPC ...... *G06F 17/2854* (2013.01); *G06F 17/2836* (2013.01)

(58) Field of Classification Search
CPC .................................................. G06F 17/289
See application file for complete search history.

(56) References Cited

U.S. PATENT DOCUMENTS

| | | | |
|---|---|---|---|
| 8,762,128 B1 | 6/2014 | Brants et al. | |
| 8,874,433 B2* | 10/2014 | Chalabi | G06F 17/2818 704/9 |
| 2008/0208563 A1* | 8/2008 | Sumita | G06F 17/28 704/2 |
| 2008/0306725 A1* | 12/2008 | Moore | G06F 17/2818 704/2 |
| 2009/0070094 A1* | 3/2009 | Best | G06F 17/289 704/2 |
| 2009/0222257 A1* | 9/2009 | Sumita | G10L 15/26 704/3 |
| 2010/0070521 A1* | 3/2010 | Clinchant | G06F 17/30669 707/760 |
| 2010/0076746 A1* | 3/2010 | Aikawa | G06F 17/2775 704/3 |
| 2010/0082324 A1* | 4/2010 | Itagaki | G06F 17/2836 704/2 |
| 2010/0094614 A1 | 4/2010 | Bilac et al. | |
| 2011/0119046 A1* | 5/2011 | Shinozaki | G06F 17/2735 704/2 |

(Continued)

*Primary Examiner* — Anne L Thomas-Homescu

(57) ABSTRACT

Exemplary embodiments relate to detecting, removing, and/or replacing objectionable words and phrases in a machine-generated translation. A classifier identifies translations containing target words or phrases. The classifier may be applied to the output translation to remove target words and phrases from the translation, or to prevent target words and phrases from being automatically presented. Further, the classifier may be applied to a translation model to prevent the target words and phrases from appearing in the output translation. Still further, the classifier may be applied to training data so that the translation model is not trained using the target words of phrases. The classifier may remove target words or phrases only when the target words or phrases appear in the output translation but not the source language input data. The classifier may be provided as a standalone service, or may be employed in the context of a machine translation system.

18 Claims, 15 Drawing Sheets

Edited Phrase Table
24

| Source Phrase | Destination Phrase | Score |
|---|---|---|
| good | guten | 0.3 |
| ~~good~~ | ~~gut~~ | ~~0.7~~ |
| ~~good~~ | ~~<German target word>~~ | ~~0.5~~ |

(56) References Cited

U.S. PATENT DOCUMENTS

| | | | |
|---|---|---|---|
| 2012/0284015 A1* | 11/2012 | Drewes | G06F 17/2818 704/3 |
| 2013/0103384 A1* | 4/2013 | Hunter | G06F 17/28 704/3 |
| 2014/0180670 A1 | 6/2014 | Osipova | |
| 2014/0303961 A1 | 10/2014 | Leydon et al. | |
| 2014/0337989 A1* | 11/2014 | Orsini | H04L 51/12 726/26 |
| 2015/0134322 A1* | 5/2015 | Cuthbert | G06F 17/289 704/3 |
| 2016/0267074 A1* | 9/2016 | Nozue | G06F 3/0488 |
| 2016/0267077 A1* | 9/2016 | Bahgat | G06F 17/2854 |
| 2016/0283204 A1* | 9/2016 | Zaiwei | G06F 9/454 |
| 2016/0306794 A1* | 10/2016 | Huang | G06F 17/2818 |
| 2017/0025120 A1* | 1/2017 | Dayan | G06F 16/335 |
| 2017/0068665 A1* | 3/2017 | Tamura | G06F 17/2818 |
| 2017/0161264 A1* | 6/2017 | Zhao | G06F 17/289 |

\* cited by examiner

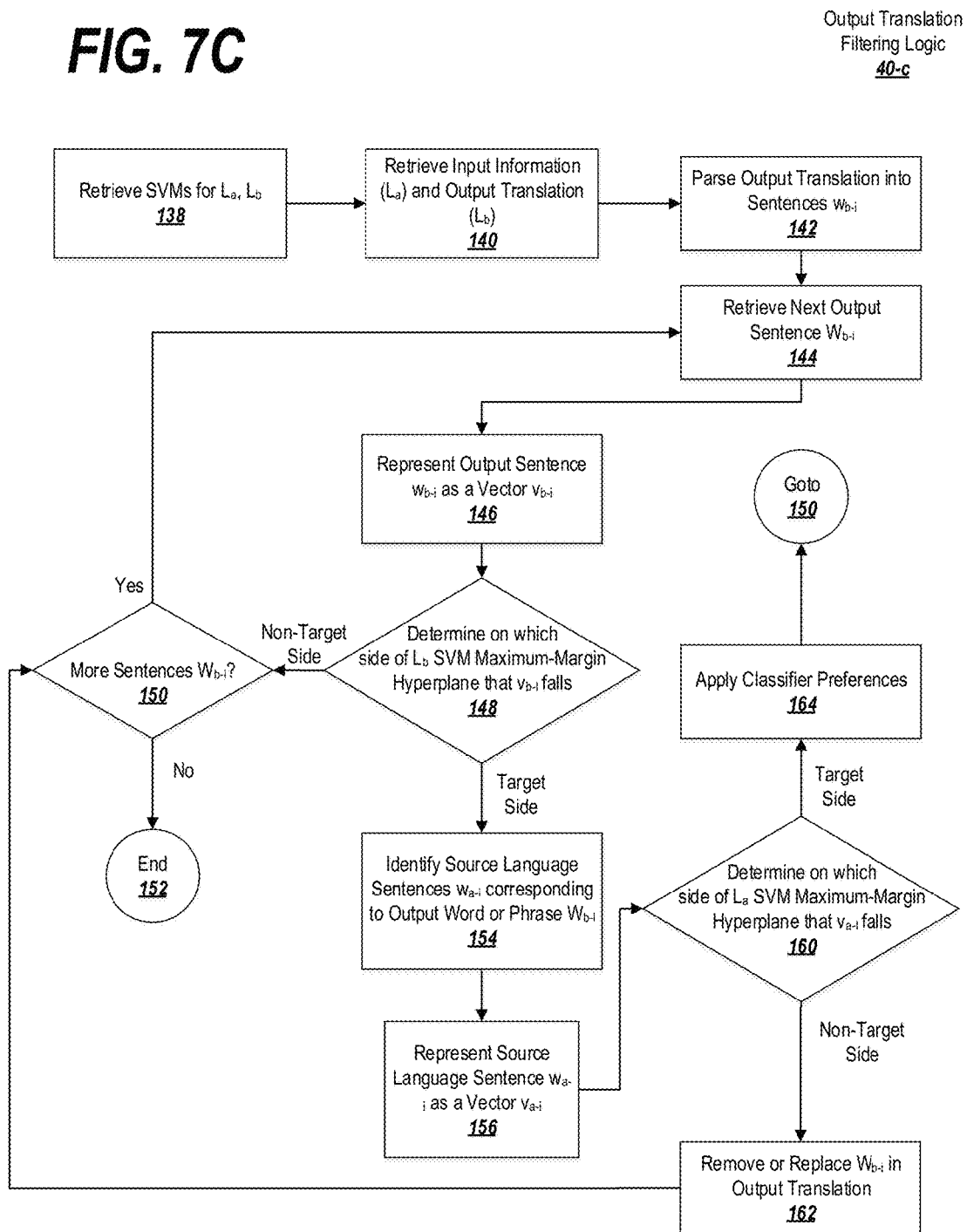

MACHINE TRANSLATION SYSTEM EMPLOYING CLASSIFIER

RELATED APPLICATIONS

This application relates to U.S. patent application entitled "Target Phrase Classifier," attorney docket number 1360F0114.1, filed concurrently herewith. The contents of the aforementioned application are incorporated herein by reference.

BACKGROUND

Machine translations involve the translation of information from a source language to a destination language via a computing device. Machine translations may be used to translate, for example, advertisements, government documents, academic works, text messages and emails, social networking posts, recordings of spoken language, and numerous other works.

Under certain circumstances, machine translation systems may introduce problematic language. For example, text in a source language may contain no objectionable material, but when subjected to machine translation objectionable material may be incorporated into the translation.

The translation system may introduce objectionable language for a number of reasons. For instance, the translation system may employ a translation model that incorrectly maps a source word in the source language to an objectionable destination word in the destination language. Thus, when the source word is translated, the translation system may incorrectly translate the source word into the objectionable destination word. Furthermore, in cases where training data is collected automatically, mined translations might not be exact and may differ in their use of explicit terms. Moreover, the translated destination word or phrase may mean the same thing as the source word or phrase, but may be an explicit or profane version of that source word or phrase—by way of illustration, the expression "Oh, no!" could be translated a number of different ways, some of which may use profane language.

Still further, machine translation systems are sometimes trained using human-translated source/destination word or phrase pairs. Human translators may ignore explicit words or phrases (or may soften them) when preparing these translations, which can result in half of the word/phrase pair having explicit content while the other half lacks explicit content.

The original speaker is likely to be offended and feel misrepresented if a machine translation introduces objectionable language into a translation. Particularly if the machine translation is offered as a service, it is important to prevent the translation system from automatically introducing objectionable words or phrases into a translation.

SUMMARY

Exemplary embodiments provide methods, mediums, and systems for detecting, removing, and/or replacing objectionable words and phrases from a machine-generated translation. According to some embodiments, a classifier is provided for identifying translations containing target words or phrases. Multiple classifiers may be provided (e.g., one for each language that serves as a source language or a destination language in a translation).

The classifier may be provided as a standalone service, or may be employed in the context of a machine translation system. As a standalone service, the classifier may receive source information (e.g., input text, a converted audio recording, etc.) containing source language words and destination information containing destination language words that have been translated from the source language words. The classifier may be applied to the source information and the destination information to determine whether the translation introduced target words or phrases into the destination information.

In the context of a machine translation system, the classifier may operate on one or more modules of the machine translation system to filter input or output data, or to change the behaviors of the one or more modules. The classifier may be applied at several different steps of the translation process. For example, the classifier may be applied to the output translation to remove target words and phrases from the translation, or to prevent target words and phrases from being automatically presented. Alternatively, or in addition, the classifier may be applied to a translation model to prevent the target words and phrases from appearing in the translation. Still further, the classifier may be applied to training data so that the translation model is not trained using the target words or phrases.

The classifier may be used to remove all target words or phrases from a translation. Alternatively, the classifier may be used to remove target words or phrases only when the target words or phrases appear in the output translation but not the source language input data (i.e., when the translation process has introduced the target words or phrases to the output translation when such words and phrases were not present in the original input data). In further embodiments, the classifier may allow the target words or phrases to stand in the output translation if the target words or phrases were also present in the source language input data.

According to exemplary embodiments, the classifier may be, or may comprise, a support vector machine (SVM). The SVM may be trained using one or more training sources, including target word lists, labeled training data (such as social networking posts that have been tagged as "explicit" or "non-explicit"), or user reports flagging certain material as offensive. Because the classifier may be embodied as an SVM, the classifier may be capable of employing machine learning techniques and may not need to rely on a target word or phrase dictionary.

These and other features and advantages will be described in more detail with reference to the attached drawings.

BRIEF DESCRIPTION OF THE DRAWINGS

FIGS. 7A-7C are flowcharts describing exemplary filtering methods;

DETAILED DESCRIPTION

Exemplary embodiments relate to a machine translation system for preventing the automatic presentation of a translation including target language (e.g., profane or explicit words). Some embodiments particularly focus on situations in which the original source material from which the translation is derived did not include corresponding target language. In such a case, the target language has been introduced to the translation, possibly contrary to the intent of the original author of the source material. In order to identify target words or phrases in the source language and/or the destination language, a classifier may be provided. The classifier may work in conjunction with or upon the machine translation system in order to prevent the target language from being automatically presented.

The machine translation system and/or classifier may prevent the target language from being automatically presented in an output translation in several ways. As described in more detail below, the classifier may be used to filter training data that is used to train the machine translation system. Alternatively or in addition, the machine translation system may be trained using training data and may produce a translation model that is used to translate new source material. The classifier may be used to filter the translation model. In both cases, the translation system may be prevented from generating an output including the target language because the translation system does not have the capability to produce such an output (the target language having been purged from the translation system itself).

Figures 1, 2A, 2B:
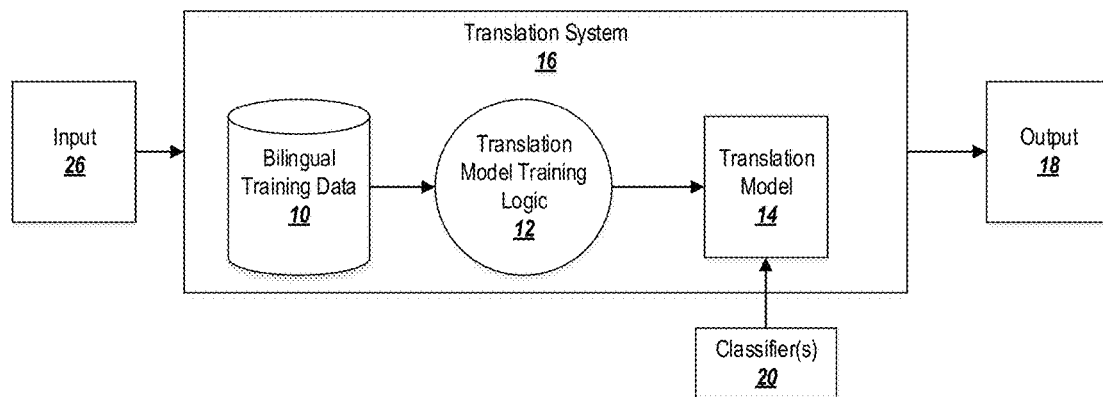
FIG. 1 depicts a simplified overview of an exemplary system for classifying target phrases.
FIGS. 2A-2B depict exemplary phrase tables before and after target phrase classification, respectively.

By way of illustration, FIGS. 1, 2A, and 2B depict an example in which a classifier is used to filter a translation model. As shown in FIG. 1, a translation system 16 includes a translation model 14, which is applied to translate an input 26 in a source language ($L_a$) into an output 18 in a destination language ($L_b$). The translation model 14 may be trained by translation model training logic 12 using bilingual training data 10 (i.e., training data including words and phrases from both the source language $L_a$ and the destination language $L_b$)

The translation model 14 may be, for example, a phrase table 22 such as the one shown in FIG. 2A. In each entry, the phrase table 22 pairs a source word or phrase with a destination word or phrase. Each pair may be associated with one or more scores that indicate the estimated fitness of the translation from the source phrase to the destination phrase. For example, in FIG. 2A, the translation of the English word "good" into the German word "gut" is associated with a score of 0.7, indicating that such a translation is a reasonably good fit. The translation of the English word "good" into the German word ""guten" is associated with a score of 0.3. This may indicate, for example, that the translation of the word "good" into "guten" did occur in the bilingual training data 10, but occurred less frequently than the translation of the word "good" into "gut."

The phrase table 22 may utilize multiple scores. For example, in addition to the above-described translation score, one or more tuning scores may also be provided. The tuning scores may, for example, be used to select from among several viable translations in view of surrounding context.

In the example of FIG. 2A, a third option has been provided for translating the English word "good." In this case, the suggested destination phrase is a target word. The target word may be, for example, an expletive or other sensitive word that was inadvertently mapped to the English word "good" (or which is synonymous with the word "good," but which is nonetheless sensitive or objectionable and therefore undesirable to include in a translation).

In some embodiments, a classifier 20 as shown in FIG. 1 may operate on the translation model 14 in order to (e.g.) remove entries from the phrase table 22 in which an inoffensive source phrase has been translated into a destination phrase including target words. FIG. 2B depicts an example of an edited phrase table 24 in which the entry corresponding to the target word has been removed. As a result, the translation system 16 of FIG. 1 is no longer capable of translating the English word "good" into the German target word, which means that the target word will not be introduced into the translated output 18.

Although FIG. 2B depicts an example in which an entry was removed when only the destination phrase include a target word (while the source phrase lacked a target word), the classifier may also operate to remove source/destination pairs when both the source phrase and the destination phrase include target words. Alternatively, if both the source phrase and the target phrase are target words, the phrase may be allowed to stand (on the assumption that, by employing a target word in the source language, the original author of the input 26 probably would not object to the inclusion of a target word in the translation).

In addition to operating on the bilingual training data and/or the translation model, the classifier may also operate on an output that has been translated from an input. The classifier may remove, replace, or obscure target words in the output, and/or may prevent the output from being automatically displayed. For example, an output that lacks target words or phrases may be automatically presented when the translation system translates the output; however, if the output includes the target words or phrases, a notification may be displayed and a user may be required to manually request that the output be presented.

Each alternative has distinct advantages. For example, applying the classifier 20 to the translation model 14 means that that explicit words or phrases are typically not introduced into the translation in the first place. Applying the classifier 20 to the output 18 may allow for better context or accuracy in the translation, because the explicit word or phrase is initially translated and then removed; thus, the resulting translation is more likely to be grammatically correct. Applying the classifier 20 to the bilingual training data 10 allows mismatched words or phrases to be thrown out before they are used to train the translation model 14, thus saving storage resources and training time.

The classifier may be, or may include, a support vector machine that represents words or phrases as vectors, identifies the vectors as being associated with target- or non-target vectors, and defines a maximum-margin hyperplane that separates the target vectors from the non-target vectors. The maximum-margin hyperplane may be applied to new data to determine whether the new data is target language or non-target language.

The classifier may also be provided as a standalone service. Source information in a source language and destination language in a destination language may be provided to the classifier. The classifier may identify whether the translation process that generated the destination language introduced target words and/or phrases into the destination information.

Although several examples discussed herein relate to the removal of explicit or profane language from machine translations, the present invention is not limited to these applications. Rather, the exemplary embodiments may be employed to prevent any type of target word or phrase from appearing in a translation. For example, it may be desirable to prevent sensitive terms pertaining to politics, religion, culture, or other sensitive terms from being inadvertently introduced into translations.

The following sections describe the classifier and the machine translation system in more detail. Before addressing these aspects, however, a general note on data collection and privacy is first provided.

A Note on Data Privacy

Some embodiments described herein make use of training data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, an overview of the machine translation system is provided.

Machine Translation System

Figure 3:
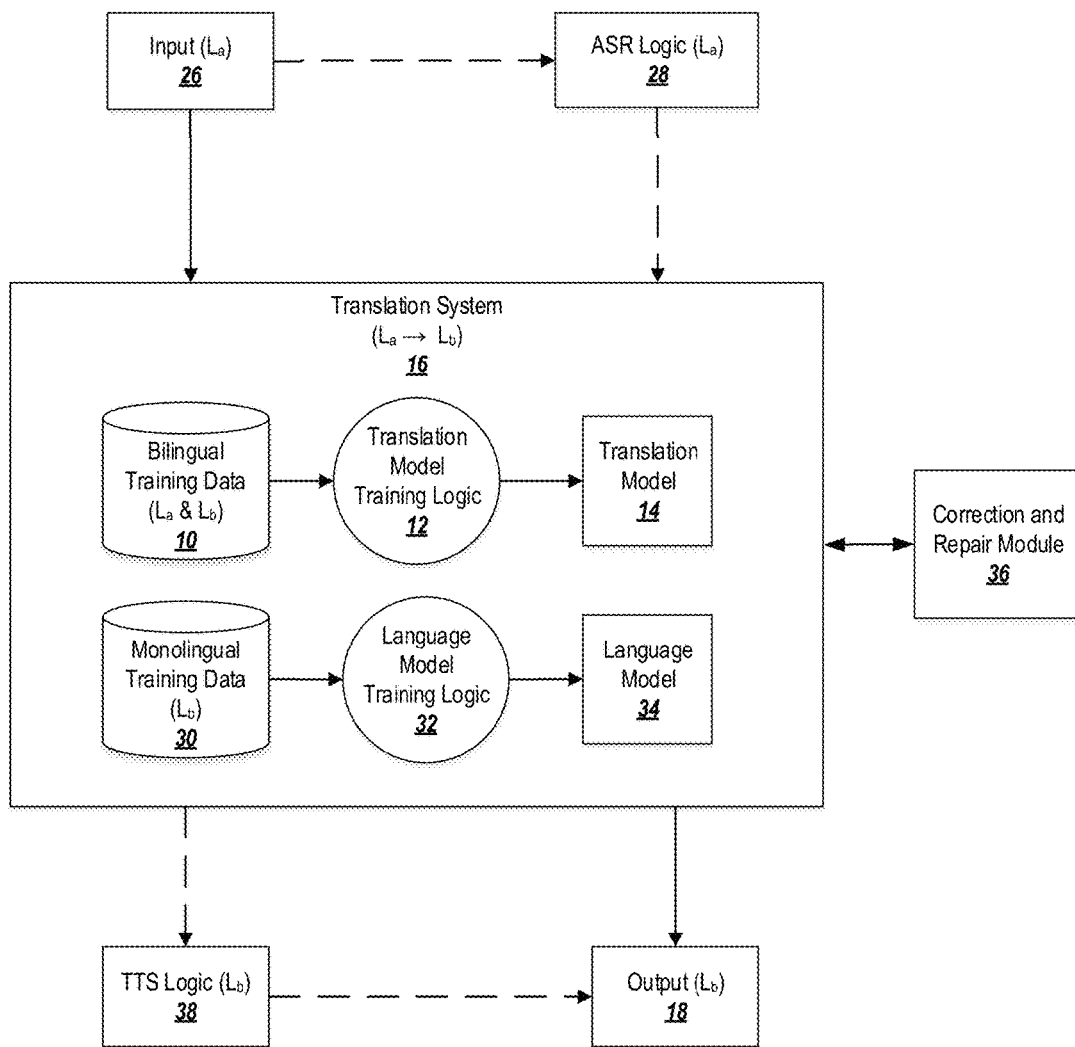
FIG. 3 is a block diagram illustrating a speech-to-speech translation system constructed according to an exemplary embodiment.

FIG. 3 is a block diagram overview of an example of a translation system suitable for use with exemplary embodiments. FIG. 3 depicts a unidirectional system in which a translation is performed from a source language $L_a$ to a destination language $L_b$; however, the present invention is not so limited. The translation system may be bidirectional, performing translation in both directions (from $L_a$ to $L_b$ and from $L_b$ to $L_a$). Moreover, a multi-directional system involving several languages $L_1 \ldots L_n$ could equally benefit from the present invention.

An input 26 may be provided to the machine translation system. The input 26 may be in the form of text in the source language $L_a$, such as text input from a keyboard via a web browser or application. The input 26 may also take other forms, such as an audio recording, writing provided directly to a computing system through a stylus or electronic pen, writing indirectly provided to a computing system (e.g., by scanning a handwritten or typed document), a photograph (e.g., a photograph of a sign), and other suitable types of input. In order to provide the input 26, a user may interact with the system via a graphical user interface displayed on a computing device screen (or active touch screen), a pointing device such as a mouse or pen, a microphone, and/or a keyboard.

In some embodiments, the translation system is operable to translate textual information from the source language $L_a$ to the destination language $L_b$. Accordingly, in order to handle multiple different types of inputs 26, logic may be provided for converting the input 26 into text. For example, FIG. 3 depicts automatic speech recognition (ASR) logic 28 that is configured to convert input audio in the source language $L_a$ into text in the source language $L_a$. In order to convert an audio recording to text, the ASR logic may utilize an acoustic model, an ASR class-based language model, and a recognition lexicon model. One example of suitable ASR logic is the "Ninja" speech recognizer system developed at Mobile Technologies, LLC. Other types of ASR logic that may be used include speech recognizers developed by IBM Corporation, Nuance, SRI, BBN, Cambridge, or Aachen University.

Other types of logic may be provided for other types of inputs 26 (e.g., optical character recognition logic for converting input handwriting or typing, image analysis logic for converting input photographs, etc.). If the translation system operates on something other than text (e.g., audio), suitable logic may be provided for converting the input 26 into a format recognizable to the translation system.

The input 26 is provided to a translation system 16 (potentially after being processed by the ASR logic 28 or other suitable logic). The translation system 16 is configured to translate the input 26 from the source language $L_a$ into the destination language $L_b$. Examples of translation systems 16 suitable for use with exemplary embodiments include the "PanDoRA" system developed at Mobile Technologies. LLC, as well as machine translation systems developed by IBM Corporation. SRI, BBN, the Moses Open Source Project, or at Aachen University.

Generally, the translation system applies a translation model 14 to source language words, phrases, sentences, etc. in the input 26 in order to develop a list of plausible candidate destination language words, phrases, sentences. etc. that may represent a translation of the source language material. The list of candidate destination language words, phrases, sentences. etc. are referred to as translation hypotheses. After generating a list of hypotheses, the list may be subjected to further analysis by a language model 34. The language model 34 considers the context in which the hypotheses are used in the destination language $L_b$, and selects one of the hypotheses as the most likely translation of the source material.

The translation model 14 may be, for example, a phrase table with entries for each hypothesis. Each entry may include a source language word, phrase, sentence, etc. and a paired destination language word, phrase, sentence, etc. Each entry may be associated with a score that represents the likelihood, in general, that the destination language portion of the pair is the translation of the source language portion of the pair. For illustration purposes, an example of a phrase table is shown in Table 1, below.

TABLE 1

| Source Material | Destination Material | Score |
|---|---|---|
| Good | Gut | 0.7 |
| Good | Guten | 0.5 |
| Good | Gültig | 0.1 |

The source/destination pairs in the phrase table may be generated from bilingual training data 10. The bilingual training data 10 may include words, phrases, sentences, etc. that have been previously translated from the source language $L_a$ to the destination language $L_b$ (or vice versa). The score in the phrase table may represent a frequency at which the source/destination pairs were found to correspond to each other in the bilingual training data 10. Translation model training logic 12 includes logic to analyze the bilingual training data 10 and create or modify entries in the phrase table based on the analysis.

As noted above, the translation model 14 produced by the translation model training logic 12 may be well-suited to generating an initial list of hypotheses indicative or possible translations for the source material. However, the translation model 14 typically does not take context into account. For example, Table 1 above shows that, in general, the word "Good" was translated into "Gut" slightly more often than it was translated into "Guten;" nonetheless, both are reasonably plausible hypotheses. Thus, without any context, it may be difficult to determine which translation is the most likely. However, assume that the previous word was translated as "Sehr" ("Very"). In German, it is much more likely that the word after "Sehr" should be translated as "Gut," rather than "Guten." In order to take this information into account, a language model 34 provides one or more tuning scores that allow the initial phrase table score to be supplemented or replaced in view of the words and phrases surrounding a particular candidate hypothesis. When presented with new information for translation, the translation system 16 may generate an initial list of hypotheses using the translation model 14, and then may select the most likely translation from among the list of hypotheses using the tuning scores provided by the language model 34.

The language model 34 used to translate a source language $L_a$ into a destination language $L_b$ is a language model 34 for the destination language $L_b$. The language model 34 may be trained using monolingual training data 30 for the destination language $L_b$. The monolingual training data 30 may be any suitable list of words, phrases, sentences, etc. from the destination language $L_b$. For example, the monolingual training data 30 may include publications, articles, or literature from the destination language $L_b$, and/or may include text collected from various sources (e.g., social networking posts, assuming that the author's privacy settings allow for the collection of such data). Language model training logic 32 includes logic configured to analyze the monolingual training data 30 and to generate one or more language models based on the occurrence of words, phrases, etc. based on their placement with respect to one another.

In some embodiments, a correction and repair module 30 employing correction logic may be provided. The correction and repair module 30 allows the user to correct the translation system 16 output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000.

User field customization logic may provide an interface for users to add new vocabulary to the system, and can also select an appropriate system vocabulary for their current situation. For example, a change in system vocabulary may be triggered by a change in location, as determined by the GPS coordinates indicating the current location of the user's device, or an explicit selection of task or location by the user.

The Correction and Repair Module 30 records and logs any corrections the user may make, which can be later used to update ASR logic 28 and translation system 16. If the correction contains a new vocabulary item, or if the user enters the field customization mode to explicitly add a new word to the system, or if a new word is automatically detected in the input audio using confidence measures or new word models, such as the method described in Thomas Schaaf, "Detection of OOV words using generalized word models and a semantic class language model," in Proc. of Eurospeech, 2001, the new vocabulary item or word may be added to the translation model 14 and/or the language model 34.

After applying the translation model 14, with or without the language model 34, to the input 26, the translation system 16 may generate an output 18 in the destination language $L_b$. The output 18 may be in a textual format and may be presented on a display device. In some embodiments, the output 18 may be automatically presented (e.g., an automatic translation or "autotranslation"). In other embodiments, a prompt may be presented and the user may request that the translation be shown. The translation may remain hidden until the user manually requests that the translation be presented.

If it is desirable to provide the output 18 in a format other than text, then logic may be employed for converting the output 18 into the desired format. For example, FIG. 3 depicts text-to-speech (TTS) logic 38 for converting the text generated by the translation system 16 into an audio recording. The TTS logic 38 generates audio output for an output device, such as a speaker. Examples of suitable TTS logic 38 include the Cepstral TTS module was used. Other TTS modules, such as TTS modules which support Windows SAPI (speech application programming interface) conventions, could also be employed.

The classifier 20 may be applied to one or more of the above-described elements. Generally speaking, the classifier may be used to filter documents or files, or may be used to modify the behavior of one or more logic modules of the system.

Figure 4A:
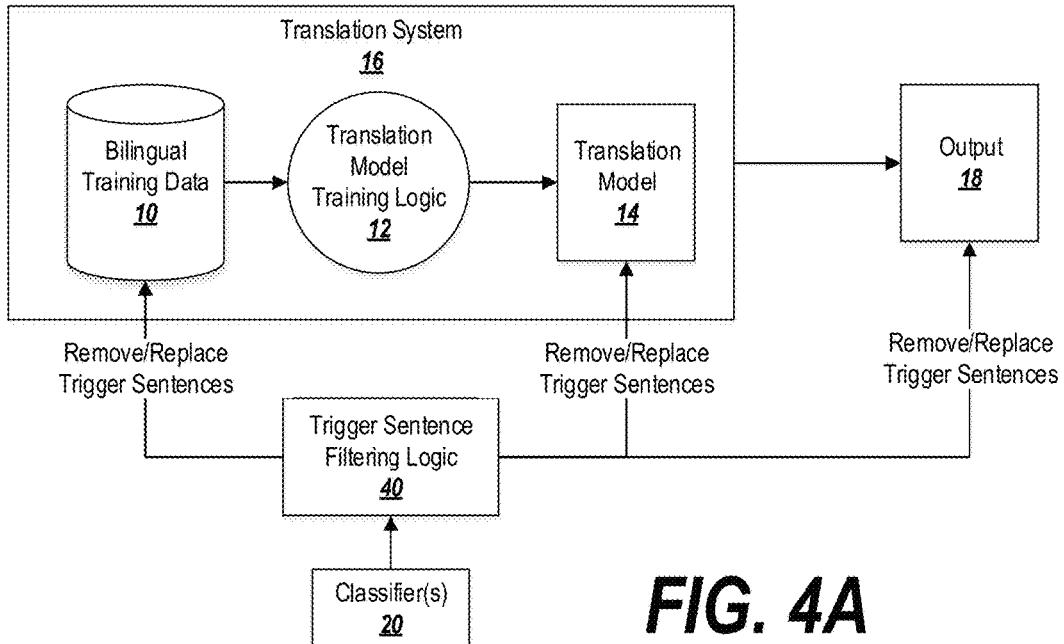
FIGS. 4A-4B depict exemplary locations in the machine translation system at which the classifier may operate in order to prevent the automatic presentation of target language.

For example, FIG. 4A depicts exemplary locations at which the classifier 20 may apply trigger sentence filtering logic 40. For example, the trigger sentence filtering logic 40 may remove or replace trigger words/phrases/sentences in the bilingual training data 10. Alternatively or in addition, the trigger sentence filtering logic 40 may remove or replace trigger word/phrase/sentence pairs in the translation model 14. Still further, the trigger sentence filtering logic 40 may remove or replace trigger words/phrases/sentences in the output 18. Examples of trigger sentence filtering logic 40 are described in more detail in connection with FIGS. 7A-7C.

Figure 4B:
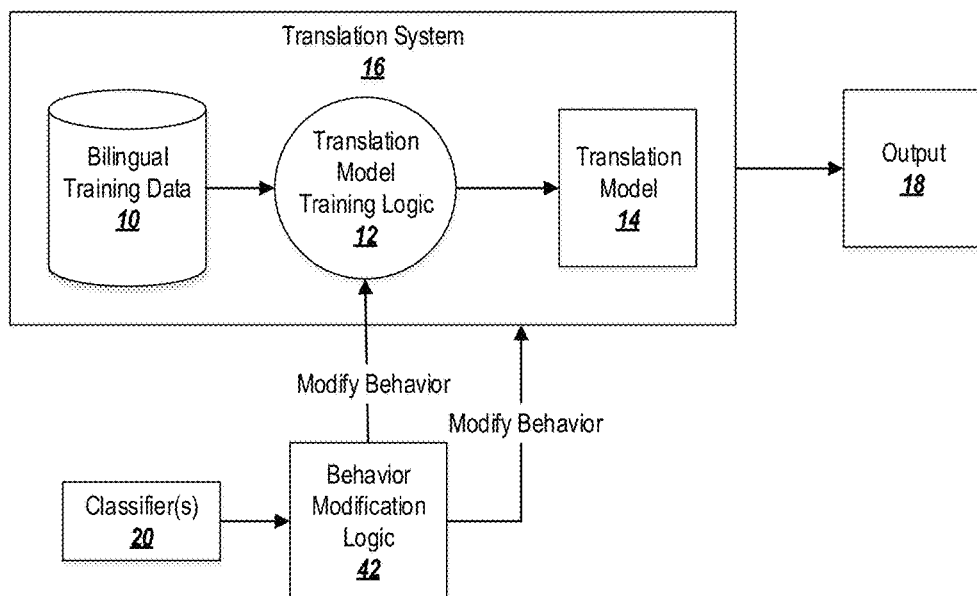

FIG. 4B depicts exemplary locations at which the classifier 20 may apply behavior modification logic 42. For example, the behavior modification logic 42 may be applied to the translation system 16 in order to modify the way that the translation system 16 translates the input 26. Alternatively or in addition, the behavior modification logic 42 may be applied to the translation model training logic 12 in order to modify the way that the translation model training logic 12 trains the translation model 14. Examples of behavior modification logic 42 are described in more detail in connection with FIGS. 8A-8B.

Figure 5:
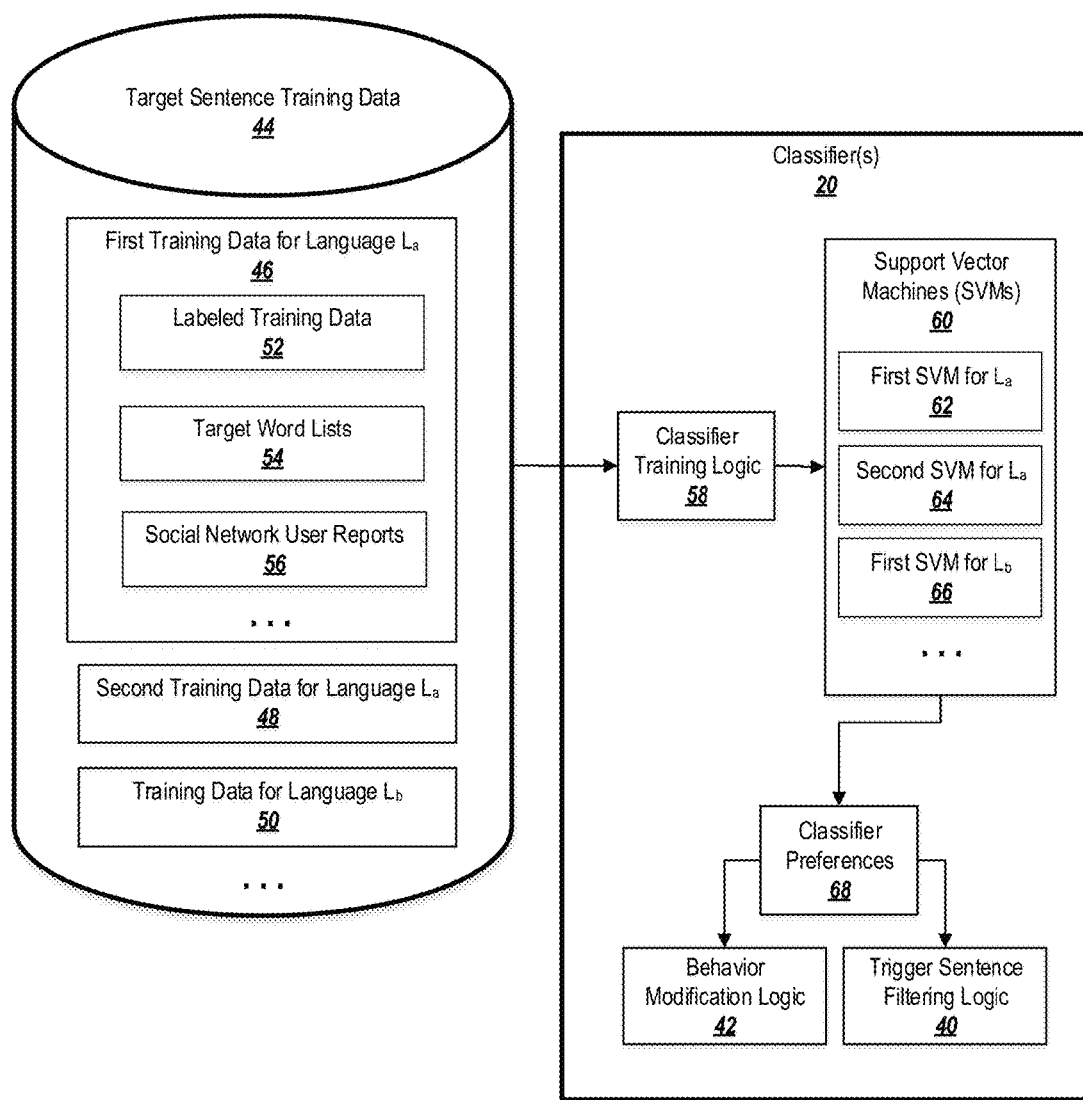
FIG. 5 depicts a classifier according to an exemplary embodiment.

The classifier 20 may be, or may include, a support vector machine that is trained using target word training data (although FIG. 5 and other descriptions herein may refer to target "sentences" for ease of discussion it is noted that the targets may be words, phrases, sentences, etc.). FIG. 5 depicts the classifier 20 and target word training data 44 for training the classifier in more detail.

The target sentence training data 44 may include labeled target language (words, phrases, sentences, etc.) in each language $L_i$ for which the classifier 20 may be trained. As shown in FIG. 5, different training data may be provided for identifying target words in different languages. Moreover, each language $L_i$ may be associated with more than one set of training data, as might be the case if different sets of target words are identified in a single language.

For example, FIG. 5 depicts a first set of training data 46 for a first language La, a second set of training data 48 for a first language $L_a$, and a set of training data 50 for a second language $L_b$. The first set of training data 46 could represent sentences including profane words in the first language $L_a$, while the second set of training data 48 could represent sentences including politically-sensitive words in the first language $L_a$. Depending on the application, the classifier 20 might apply the first set of training data 46, the second set of training data 48, or both.

Multiple classifiers 20 may be used in connection with a translation system (e.g., one classifier 20 may be provided for each set of training data), or a translation system may be used in connection with a single classifier 20. The single classifier 20 may be capable of recognizing different types of target words, depending on the training data used to train the classifier 20.

Each set of training data 46, 48, 50 may include entries made up of words, sentences, phrases, etc., where each entry is labeled as either including target language ("target" entries) or not including target language ("non-target" entries).

For example, a set of training data may include labeled training data 52, which represents entries that have been labeled, typically by a human user, as being target or non-target. Labeled training data 52 is typically highly relevant, but may be expensive or difficult to produce, due to the need to have a human user label each entry.

A set of training data may also include a target word list 54. The target word list 54 may include a list of words, phrases, sentences, etc. that each include target language. Because each entry in a target word list is assumed to be of the "target" type, there is no need to label each individual entry. Thus, producing a target word list 54 may be less expensive of difficult as compared to producing a labeled set of training data 52, since each entry does not need to be individually analyzed to determine whether it is a target or non-target. However, the classifier 20 may perform better if trained using both target and non-target data, and so it may be beneficial to supplement target word lists 54 with other types of training data.

A set of training data may also include user reports 56. For example, in a social network, users may be able to flag posts, entries, or other materials as being inappropriate. After obtaining authorization from a user, the user's social network entries may be collected and analyzed to determine if they have been marked as inappropriate or not. Entries marked as inappropriate may be labeled as including target language, while unflagged entries may be labeled as non-target. However, user reports 56 may be highly subjective and therefore subject to a great deal of noise. One user may flag an entry as inappropriate when other users would not consider the post to be inappropriate. Moreover, a user may flag a post as inappropriate simply because the user disagrees with the sentiments in the post or does not like the speaker. Thus, although user reports 56 may be relatively simple and inexpensive to collect, they may introduce noise into the classifier 20.

Although FIG. 5 depicts particular types of training data 44, one of ordinary skill in the art will recognize that other types of training data may also be suitable for training a classifier 20.

The target word training data 44 may be provided to classifier training logic 58. The classifier training logic 58 may receive the target word training data 44, identify target- and non-target entries, and may apply training algorithms to set parameters for the classifier 20 based on the training data 44 so that the classifier 20 may apply the parameters to new words, phrases, etc. in order to classify the new materials as either target or non-target. An example of classifier training logic 58 is described in more detail in connection with FIG. 6B.

In exemplary embodiments, the classifier training logic 58 may apply machine learning techniques. For example, the classifier 20 may be, or may comprise, one or more support vector machines (SVMs) 60. A support vector machine 60 analyzes data and learns to recognize patterns in the data, making support vector machines 60 particularly well-suited to serving as part of the classifier 20. Support vector machines are trained by mathematically defining a divider that separates target from non-target data. The divider may be applied to new data to determine whether the new data falls on the target or non-target side. As a result, a support vector machine may classify data without the need to rely on a dictionary or list of target words and phrases, which makes them particularly efficient and adaptable. In practice, the inventors have found that support vector machines are capable of correctly classifying target and non-target language at a rate of about 75%-85%. Support vector machines are described in more detail in connection with FIGS. 6A-6B.

The classifier 20 may include multiple support vector machines 60. In some embodiments, each of the support vector machines 60 may be mapped to a particular set of training data 44. For example, FIG. 5 depicts: a first support vector machine for a first language $L_a$ 62, which corresponds to the first training data for the first language $L_a$ 46; a second support vector machine for the first language $L_a$ 64, which corresponds to the second training data for the first language $L_a$ 48; and a first support vector machine for a second language $L_b$ 66, which corresponds to the training data for the second language $L_b$ 50.

Alternatively, a classifier 20 may include a single support vector machine 60, and multiple classifiers 20 may be used in connection with the translation system 16. Still further, a single classifier 20 may include all of the support vector machines 60 applicable to a single language $L_i$, and may be instructed as to which target words (and therefore which support vector machines 60) should be applied in a given circumstance. Other combinations are also possible.

The classifier 20 may also include classifier preferences 68, which specify how the support vector machines 60 are applied to classify or manipulate new data. For example, one preference 68 may indicate how to treat new data when both a source language input and a destination language output includes target material. Such a preference 68 might specify, for example, that such a situation is acceptable (e.g., because the original author likely intended to include the target language and therefore would not object to its presence in the translation) and that therefore the translation should be presented as-translated. Alternatively, such a preference 68 might specify that the target word or phrase in the translation should be replaced with a non-target word or phrase, if one is available, or removed altogether, or obscured, or that an option may be presented to allow a user to manually cause the translation to be presented.

Based on the support vector machines 60 and the classifier preferences 68, the classifier 20 may produce or may apply target word filtering logic 40 and/or behavior modification logic 42. The target word filtering logic 40 may cause one or more documents, translations, files, or other representations of information to be filtered (e.g., to remove or replace target words, phrases, or whole sentences). Examples of target word filtering logic 40 are described in connection with FIGS. 7A-7C. The behavior modification logic 42 may alter or modify the behavior of one or more components of the translation system 16. Examples of behavior modification logic 42 are described in connection with FIGS. 8A-8B.

Before providing examples of target word filtering logic 40 and behavior modification logic 42, machine learning techniques for training the classifier 20 are next described.

Training the Classifier

Figure 6A:
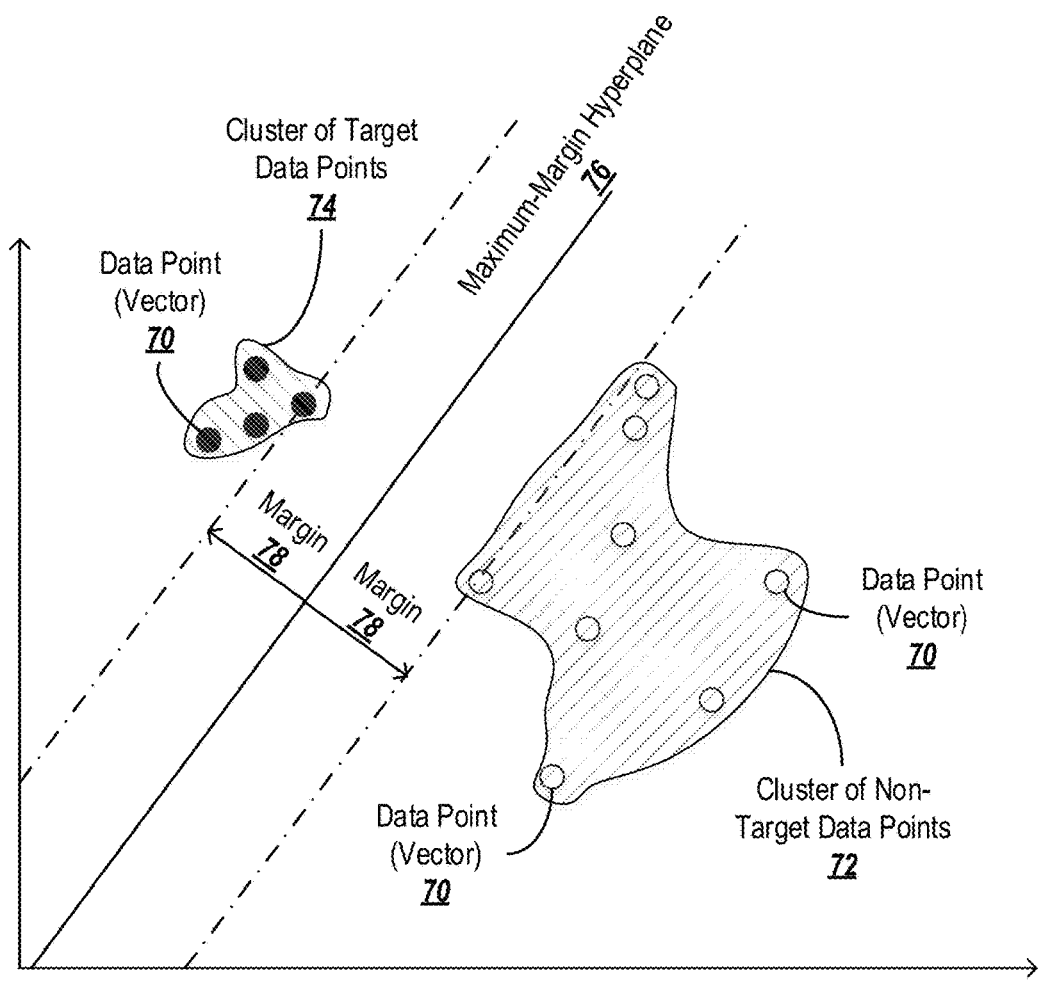
FIGS. 6A-6B describe exemplary embodiments in which the classifier includes a source vector machine.

As noted above, the classifier 20 may employ machine learning techniques. To that end, the classifier 20 may be, or may include, a support vector machine. Support vector machines classify data by organizing the data into groups and defining a divider that separates one groups from another. FIG. 6A provides an example of such a divider.

As shown in FIG. 6A, the training data 44 has been organized into a plurality of data points 70. For example, each training data entry (a word, phrase, etc.) may be represented as a vector having n dimensions. Each training data entry is also associated with a classification or label indicating whether the entry is or includes target language. The entries may be plotted in n-dimensional space, where the number of dimensions of the plot corresponds to the number of dimensions of the vector representing each entry. The resulting plot may include a cluster of non-target data points 72 and a cluster of target data points 74.

As can be seen in FIG. 6A, the cluster of non-target data points 72 are separated from the cluster of target data points 74. A divider in n−1 dimensions separates the cluster of non-target data points 72 from the cluster of target data points 74. In fact, multiple possible n−1 dimensional dividers exist (e.g., different lines having different slopes). However, only one such divider will define a parallel line yielding a margin 78 on either side of the divider which has the greatest distance from the respective cluster on that side to the divider. Such a divider which maximizes the margin 78 on either side of the divider is referred to as a maximum-margin hyperplane 76. A line which defines the margin 78 may pass through the target or non-target data point 70 that is closest to the maximum-margin hyperplane 76. It is noted that, although FIG. 6A depicts a linear maximum-margin hyperplane 76, non-linear maximum-margin hyperplanes 76 are also possible. The goal of a support vector machine training algorithm is to identify the maximum-margin hyperplane 76 that separates the target data from the non-target data.

Figure 6B:
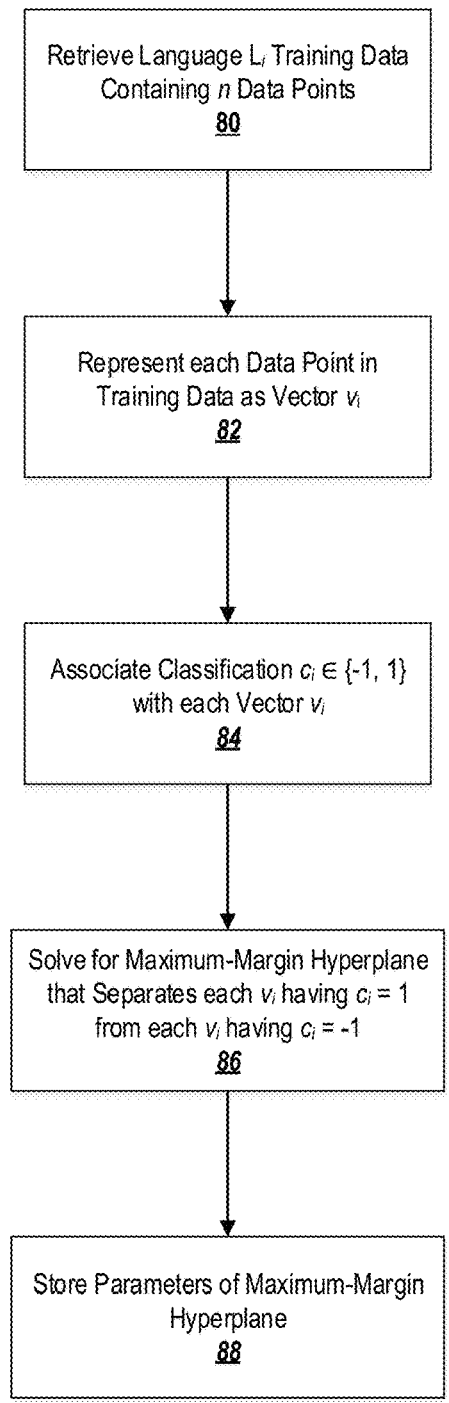

FIG. 6B depicts an exemplary embodiment of classifier training logic 58 for training a support vector machine 60. Initially, at step 80, the classifier training logic may retrieve training data for a language $L_i$ having n data points. The training data may be retrieved from the target word training data 44.

At step 82, the classifier training logic 58 may represent each data point retrieved from the training data as a vector $v_i$, where $v_i \in \{v_1, \ldots, v_n\}$. For example, each character of the training data entry may be represented as a location x in the vector ($v_i[x]$).

At step 84, the classifier training logic 58 may associate a classification $c_i$ with each Vector $v_i$. For example, the classifier training logic may consult a label associated with each entry in the training data 44 in order to assign a classification $c_i \in \{-1, 1\}$ to each vector $v_i$. Although this exemplary embodiment assigns a value of −1 or 1 to each vector $v_i$, one of ordinary skill in the art will recognize that other classifications are also possible (e.g., each vector $v_i$ may be assigned a classification of 0 or 1, or "true" or "false," or any other suitable set of identifiers).

At step 86, the classifier training logic 58 may solve for the maximum-margin hyperplane that separates each vector $v_i$ having a classification $c_i=1$ from each vector $v_i$ having a classification $c_i=-1$. Several algorithms exist for identifying the maximum-margin hyperplane, and may be employed as appropriate.

At step 88, having solved for the maximum-margin hyperplane, the classifier training logic 58 may store the parameters that define the maximum-margin hyperplane. The stored parameters may be used to recreate the maximum-margin hyperplane so that the maximum-margin hyperplane may be applied to new data. By determining on which side of the maximum-margin hyperplane the data falls, the classifier may determine whether the new data is target or non-target data.

Once the classifier is trained using a method similar to the one depicted in FIG. 6B, the classifier may be applied in a number of ways. Exemplary classifier application techniques are next described with reference to FIGS. 7A-8B.

Applying the Classifier

Figure 7A:
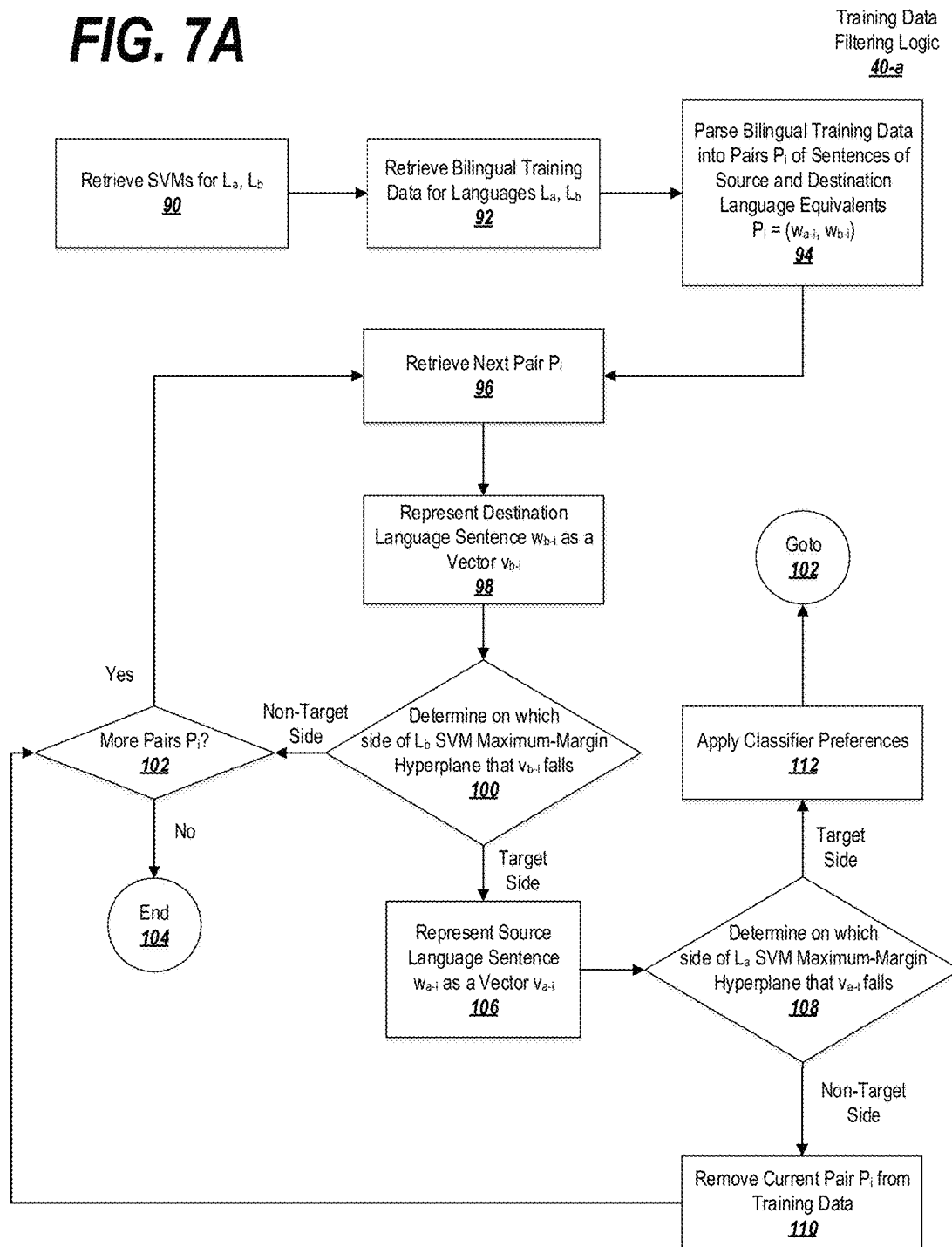
Figure 7B:
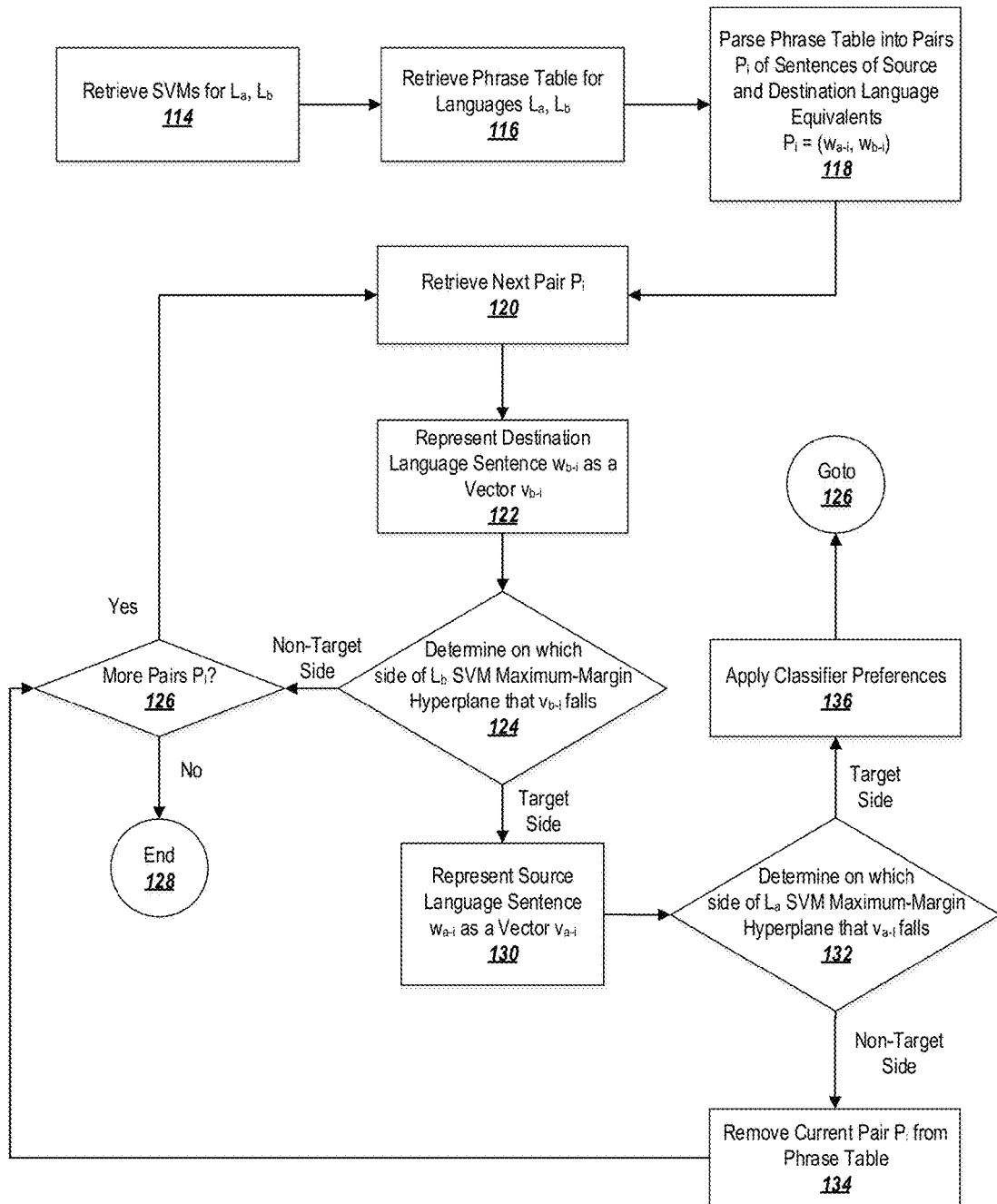

FIGS. 7A-7C describe exemplary techniques in which the classifier applies a filter at one or more locations to filter a document, file, representation, etc.

For example, FIG. 7A depicts exemplary training data filtering logic 40-*a*. The training data filtering logic 40-*a* may be applied to filter training data (e.g., the target word training data 44 or bilingual training data 10) that is used to train the translation model 14. Once the target words are filtered out of the training data, the translation model 14 is not trained to recognize the target words, and therefore will not be capable of producing an output translation that includes the target words. One advantage of this solution is efficiency: the classifier is not trained on target words and therefore no time or processing resources is wasted in training the translation model 14 to produce unwanted outputs. A possible disadvantage to this approach is that the translations produced by a translation model 14 trained on filtered data may be less likely to be strictly correct (e.g., grammatically correct) because some of the words and phrases that the translation model 14 is applied to translate will not be recognized or considered.

The training data filtering logic 40-*a* may be applied to, for example, bilingual training data 10 including pairs of words, phrases, sentences, etc. in a source language ($L_a$) and a destination language ($L_b$). The training data filtering logic 40-*a* begins at step 90, where the source vector machines for the source language $L_a$ and the destination language b are retrieved. For example, the source vector machines may be retrieved from the group of source vector machine 60 stored in the classifier 20.

At step 92, the training data filtering logic 40-*a* may retrieve the bilingual training data 10 that matches the source language $L_a$ to the destination language $L_b$. The bilingual training data 10 may be stored with the translation system 16 on a translation server, or may be stored remotely from the translation system 16.

At step 94, the training data filtering logic 40-*a* may parse the bilingual training data 10. The bilingual training data 10 may include entries in which a word, phrase, sentence, etc. in the source language is paired with equivalent material in the destination language. The training data filtering logic 40-*a* may parse the entries into pairs $P_i$ of sentences (although word or phrase pairs could also be used) of source and destination language equivalents (e.g., $P_i = (w_{a-i}, w_{b-i})$, where $w_{a-i}$ is a sentence in the source language $L_a$ and $w_{b-i}$ is an equivalent sentence in the destination language $L_b$).

At step 96, the next pair $P_i$ may be retrieved from memory. The retrieved pair may include a source language sentence $w_{a-i}$ and a destination language sentence $w_{b-i}$.

At step 98, the retrieved destination language sentence $w_{b-i}$ may be represented as an n-dimensional vector $v_{b-i}$, where n is the number of dimensions used to represent the training data for the source vector machine of the destination language which is being applied by the classifier. In other words, if the source vector machine for the destination language $L_b$ that was retrieved at step 90 defined a maximum-margin hyperplane on the basis of training data having n dimensions, then at step 98 the destination language sentence $w_{b-i}$ may also be represented as a vector in n dimensions.

At step 100, the training data filtering logic 40-*a* may determine whether the vector $v_{b-i}$ created at step 98 falls on the target side or the non-target side of the maximum-margin hyperplane for the source vector machine for the destination language $L_b$ retrieved at step 90. The vector $v_{b-i}$ may be plotted in n-dimensional space along with the maximum-margin hyperplane, and the training data filtering logic 40-*a* may evaluate the plotted vector $v_{b-i}$ to determine on which side of the hyperplane the vector falls.

If the vector $v_{b-i}$ falls on the non-target side of the hyperplane, then there is a strong likelihood that the destination language side of the pair $P_i$ in the bilingual training data was not a target word, phrase, sentence, etc. Thus, no action needs to be taken with respect to this particular pair $P_i$, since applying this training data will not cause the translation model 16 to introduce target language into a translation. Therefore, at step 102, the training data filtering logic 40-*a* determines whether any more pairs $P_i$ remain to be evaluated. If so, processing returns to step 96 and the next pair is retrieved. If not, processing proceeds to step 104 and ends.

If, on the other hand, the vector $v_{b-i}$ was found to fall on the target side of the hyperplane at step 100, then at step 106 the training data filtering logic 40-*a* represents the source language portion $w_{a-i}$ of the pair $P_i$ as a vector $v_{a-i}$, and at step 108 determines which side of the hyperplane the vector $v_{a-i}$ falls.

If the vector $v_{a-i}$ falls on the non-target side of the hyperplane, then this means that the original source portion of the pair was likely non-target language but the destination portion of the pair was target; i.e., applying this particular pair $P_i$ to train the language model 16 will cause the language model 16 to introduce target language into a translation in situations in which the source material did not include target language. Therefore, at step 100 the entry corresponding to the current pair $P_i$ is removed from the bilingual training data 10, and processing returns to step 102 where the training data filtering logic 40-*a* determines whether more pairs remain to be evaluated.

On the other hand, of the vector $v_{a-i}$ falls on the target side of the hyperplane, then this means that both the source portion of the pair $P_i$ and the destination portion of the pair $P_i$ included target language. It may be desirable to address this situation in different ways, depending on the application. For example, in some situations it may be acceptable to allow target language to stand in the destination-side translation when the original source-side material included the target language. In other situations, it may be desirable to remove all target language from the translation, even when the original source included the target language. How to address this situation may be defined in the classifier preferences 68. Therefore, at step 112, the training data filtering logic 40-*a* may consult the classifier preferences 68 to determine whether the entry corresponding to the current pair $P_i$ should be allowed to remain as-is, should be removed, or should be edited in some way (e.g., to replace the destination-side target sentence $w_{b-i}$ with a non-target, softer sentence).

Processing may then proceed to step 102, where the training data filtering logic 40-*a* determines whether additional entries remain to be evaluated.

In some embodiments, at steps 100 and 108 the system may consider the sentences $w_{a-i}$ and $w_{b-i}$ to be target sentences even if they did not fall on the target side of the maximum-margin hyperplane, but did fall within a predetermined threshold of the hyperplane. This may allow the training data filtering logic 40-*a* to be more conservative in classifying new data, which means that more data will be filtered out. Although there may be some false positives among the filtered data, it may be desirable to apply a more conservative filter in order to increase the likelihood of removing more target sentences from the training data.

FIG. 7B depicts exemplary phrase table filtering logic 40-*b*. The phrase table filtering logic 40-*b* may be applied to filter a phrase table (e.g., a phrase table that forms part of the translation model 14) that is used to translate an input in a source language. Once the target sentences (or words, phrases, etc.) are filtered out of the phrase table, the translation model 14 is not able to translate the target sentences, and therefore will not be capable of producing an output translation that includes the target sentences. One advantage of this solution is that no front-end check is required on the output translation, and it is not necessary to prevent the translation system 16 from autotranslating an input. A possible disadvantage to this approach is that the translations produced by a translation model 14 using a filtered phrase table may be less likely to be strictly correct (e.g., grammatically correct) because some of the words and phrases that the translation model 14 is applied to translate will not be recognized or considered.

The phrase table filtering logic 40-*b* may be applied to, for example, a translation model 14 and/or an associated phrase table including pairs of words, phrases, sentences, etc. in a source language ($L_a$) and a destination language ($L_b$). The phrase table filtering logic 40-*a* begins at step 114, where the source vector machines for the source language $L_a$ and the destination language $L_b$ are retrieved. For example, the source vector machines may be retrieved from the group of source vector machine 60 stored in the classifier 20.

At step 116, the phrase table filtering logic 40-*b* may retrieve the phrase table that matches the source language $L_a$ to the destination language $L_b$. The phrase table may be stored with the translation system 16 on a translation server, or may be stored remotely from the translation system 16.

At step 118, the phrase table filtering logic 40-b may parse the phrase table. The phrase table may include entries in which a word, phrase, sentence, etc. in the source language is paired with equivalent material in the destination language. The phrase table filtering logic 40-b may parse the entries into pairs $P_i$ of sentences (or words or phrases) of source and destination language equivalents (e.g., $P_i=(w_{a-i}, w_{b-i})$, where $w_{a-i}$ is a sentence in the source language $L_a$ and $w_{b-I}$ is an equivalent sentence in the destination language $L_b$).

At step 120, the next pair $P_i$ may be retrieved from memory. The retrieved pair may include a source language sentence $w_{a-i}$ and a destination language sentence $w_{b-i}$.

At step 122, the retrieved destination language sentence $w_{b-i}$ may be represented as an n-dimensional vector $v_{b-i}$, where n is the number of dimensions used to represent the training data for the source vector machine of the destination language which is being applied by the classifier. In other words, if the source vector machine for the destination language $L_b$ that was retrieved at step 114 defined a maximum-margin hyperplane on the basis of training data having n dimensions, then at step 122 the destination language sentence $w_{b-i}$ may also be represented as a vector in n dimensions.

At step 124, the phrase table filtering logic 40-b may determine whether the vector $v_{b-i}$ created at step 122 falls on the target side or the non-target side of the maximum-margin hyperplane for the source vector machine for the destination language $L_b$ retrieved at step 114. The vector $v_{b-i}$ may be plotted in n-dimensional space along with the maximum-margin hyperplane, and the phrase table filtering logic 40-b may evaluate the plotted vector $v_{b-i}$ to determine on which side of the hyperplane the vector falls.

If the vector $v_{b-i}$ falls on the non-target side of the hyperplane, then there is a strong likelihood that the destination language side of the pair $P_i$ in the phrase table was not a target word, phrase, sentence, etc. Thus, no action needs to be taken with respect to this particular pair $P_i$, since applying this entry in the phrase table will not cause the translation model 16 to introduce target language into a translation. Therefore, at step 126, the phrase table filtering logic 40-b determines whether any more pairs $P_i$ remain to be evaluated. If so, processing returns to step 120 and the next pair is retrieved. If not, processing proceeds to step 128 and ends.

If, on the other hand, the vector $v_{b-i}$ was found to fall on the target side of the hyperplane at step 124, then at step 130 the phrase table filtering logic 40-b represents the source language portion $w_{a-i}$ of the pair $P_i$ as a vector $v_{a-i}$, and at step 132 determines which side of the hyperplane the vector $v_{a-i}$ falls.

If the vector $v_{a-i}$ falls on the non-target side of the hyperplane, then this means that the original source portion of the pair was likely non-target language but the destination portion of the pair was target; i.e., applying this particular pair $P_i$ to train the language model 16 will cause the language model 16 to introduce target language into a translation in situations in which the source material did not include target language. Therefore, at step 134 the entry corresponding to the current pair $P_i$ is removed from the phrase table, and processing returns to step 126 where the phrase table filtering logic 40-b determines whether more pairs remain to be evaluated.

On the other hand, of the vector $v_{a-i}$ falls on the target side of the hyperplane, then this means that both the source portion of the pair $P_i$ and the destination portion of the pair $P_i$ included target language. It may be desirable to address this situation in different ways, depending on the application. For example, in some situations it may be acceptable to allow target language to stand in the destination-side translation when the original source-side material included the target language. In other situations, it may be desirable to remove all target language from the translation, even when the original source included the target language. How to address this situation may be defined in the classifier preferences 68. Therefore, at step 136, the phrase table filtering logic 40-b may consult the classifier preferences 68 to determine whether the entry corresponding to the current pair $P_i$ should be allowed to remain as-is, should be removed, or should be edited in some way (e.g., to replace the destination-side target sentence $w_{b-i}$ with a non-target, softer sentence).

Processing may then proceed to step 126, where the phrase table filtering logic 40-b determines whether additional entries remain to be evaluated.

In some embodiments, at steps 124 and 132 the system may consider the sentences $w_{a-i}$ and $w_{b-i}$ to be target sentences even if they did not fall on the target side of the maximum-margin hyperplane, but did fall within a predetermined threshold of the hyperplane. This may allow the phrase table filtering logic 40-b to be more conservative in classifying new data, which means that more data will be filtered out. Although there may be some false positives among the filtered data, it may be desirable to apply a more conservative filter in order to increase the likelihood of removing more target sentences from the training data.

FIG. 7C depicts exemplary output translation filtering logic 40-c for filtering the output translation 18 created by the translation system 16. Filtering target sentences from the output translation 18 has the advantage of causing the target sentences to be translated as normal, which means that the output translation 18 is more likely to be grammatically correct (because all aspects of the source material are accounted for in the translation). A possible disadvantage is that target sentences can be introduced into the translation 18 before they are filtered out, which makes it undesirable to perform an automatic translation. Thus, showing the translation may require that a user manually indicates that they are willing to view the translation, even if the translation involves target language.

The output translation filtering logic 40-c may be applied to, for example, an output translation 18 including pairs of words, phrases, sentences, etc. in a destination language ($L_b$) that was produced based on source material in a source language ($L_a$). The output translation filtering logic 40-c begins at step 138, where the source vector machines for the source language $L_a$ and the destination language $L_b$ are retrieved. For example, the source vector machines may be retrieved from the group of source vector machine 60 stored in the classifier 20.

At step 140, the output translation filtering logic 40-b may retrieve the input information 26 in the source language source language $L_a$ that was used to produce the output translation 18 in the destination language $L_b$.

At step 142, the output translation filtering logic 40-c may parse the output translation 18. The output translation 18 may include words, phrases, sentences, etc. in the destination language. In one example, the output translation filtering logic 40-c may parse the entries into words in the destination language ($w_{b-i}$).

At step 144, the next word $w_{b-i}$ may be retrieved from memory. At step 146, the retrieved destination language word $w_{b-i}$ may be represented as an n-dimensional vector $v_{b-i}$, where n is the number of dimensions used to represent the training data for the source vector machine of the destination language which is being applied by the classifier. In other words, if the source vector machine for the destination language $L_b$ that was retrieved at step 138 defined a maximum-margin hyperplane on the basis of training data having n dimensions, then at step 146 the destination language word $w_{b-i}$ may also be represented as a vector in n dimensions.

At step 148, the output translation filtering logic 40-c may determine whether the vector $v_{b-i}$ created at step 146 falls on the target side or the non-target side of the maximum-margin hyperplane for the source vector machine for the destination language $L_b$ retrieved at step 138. The vector $v_{b-i}$ may be plotted in n-dimensional space along with the maximum-margin hyperplane, and the output translation filtering logic 40-c may evaluate the plotted vector $v_{b-i}$ to determine on which side of the hyperplane the vector falls.

If the vector $v_{b-i}$ falls on the non-target side of the hyperplane, then there is a strong likelihood that the word in question is not a target word, phrase, etc. Thus, no action needs to be taken with respect to this particular word $w_{b-i}$. Therefore, at step 150, the output translation filtering logic 40-c determines whether any more words $w_{b-i}$ remain to be evaluated. If so, processing returns to step 144 and the next pair is retrieved. If not, processing proceeds to step 152 and ends.

If, on the other hand, the vector $v_{b-i}$ was found to fall on the target side of the hyperplane at step 148, then at step 154 the output translation filtering logic 40-c may identify a source language word or phrase $w_{a-i}$ that corresponds to the destination language word or phrase $w_{b-i}$. For example, the output translation filtering logic 40-c may consult the phrase table of the translation logic 16 to determine what source language word $w_{a-i}$ matches the destination language word $w_{b-i}$.

At step 156 the output translation filtering logic 40-c represents the source language word $w_{a-i}$ as a vector $v_{a-i}$, and at step 160 determines which side of the hyperplane the vector $v_{a-i}$ falls.

If the vector $v_{a-i}$ falls on the non-target side of the hyperplane, then this means that the original source word $w_{a-i}$ was likely non-target language but the destination word $w_{b-i}$ was target. Therefore, at step 162, the output translation filtering logic 40-c removes or replaces the word $_{wb-I}$ in the output translation 18. For example, the word may be removed from the translation, replaced with another (e.g., softer) predetermined word, or edited e.g., some letters may be replaced with symbols such as "*"). Processing then returns to step 150 where the output translation filtering logic 40-c determines whether more words remain to be evaluated.

On the other hand, of the vector $v_{a-i}$ falls on the target side of the hyperplane, then this means that both the source word $w_{a-i}$ and the destination word $w_{b-i}$ included target language. It may be desirable to address this situation in different ways, depending on the application. For example, in some situations it may be acceptable to allow target language to stand in the destination-side translation when the original source-side material included the target language. In other situations, it may be desirable to remove all target language from the translation, even when the original source included the target language. How to address this situation may be defined in the classifier preferences 68. Therefore, at step 164, the output translation filtering logic 40-c may consult the classifier preferences 68 to determine whether the output translation should be allowed to remain as-is, or should be edited in some way (e.g., to replace the destination-side target word $w_{b-i}$ with a non-target, softer word).

Processing may then proceed to step 150, where the output translation filtering logic 40-c determines whether additional entries remain to be evaluated.

In some embodiments, at steps 148 and 160 the system may consider the words $w_{a-i}$ and $w_{b-i}$ to be target words even if they did not fall on the target side of the maximum-margin hyperplane, but did fall within a predetermined threshold of the hyperplane. This may allow the output translation filtering logic 40-c to be more conservative in classifying new data, which means that more data will be filtered out. Although there may be some false positives among the filtered data, it may be desirable to apply a more conservative filter in order to increase the likelihood of removing more target words from the training data.

Figure 8A:
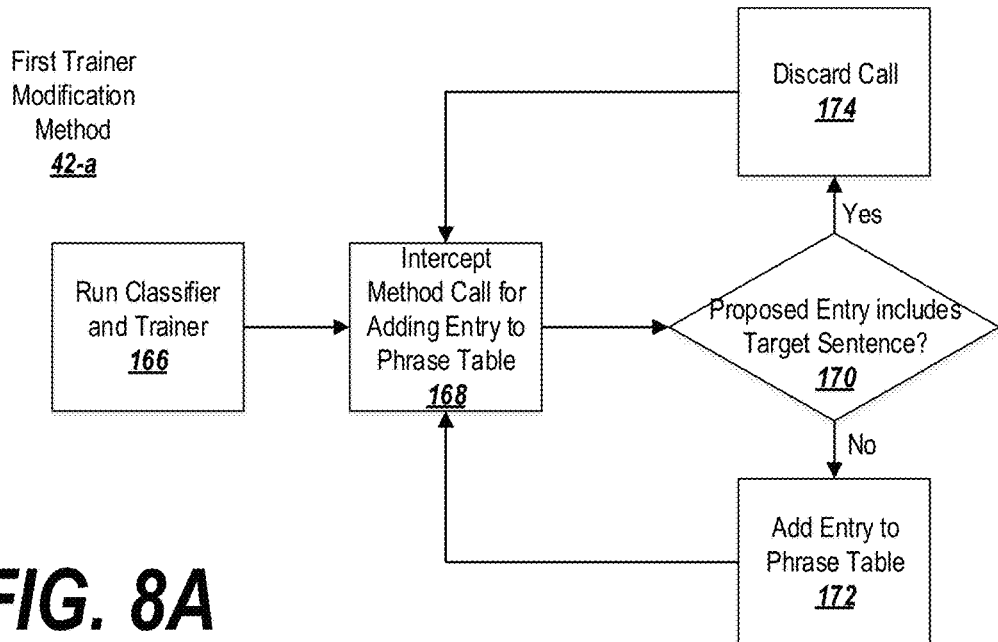
FIGS. 8A-8C are flowcharts describing exemplary behavior modification methods.

Alternatively or in addition to filtering documents, representations, or files, the classifier 20 may also modify the behavior of the translation system 16. For example, FIG. 8A depicts an exemplary modification method 42-a for modifying the behavior of the translation model training logic 12.

The method 42-a begins at step 166, when the classifier 20 and training logic 12 are started. For example, the classifier 20 and training logic 12 may be run in corresponding threads.

At step 168, the classifier 20 may intercept a method call from the training logic 12 for adding an entry in to the phrase table. At this stage, the training logic 12 is attempting to add a new entry, and the classifier 20 may check to determine whether the new entry maps non-target language to target language.

Accordingly, at step 170, the classifier 20 may determine whether the proposed entry includes a target word or phrase. For example, the classifier 20 may apply appropriate source vector machines 60 to determine which side of the maximum-margin hyperplane the source language word and/or destination language word falls.

If the new entry does not include a target word or phrase, then processing proceeds to step 172 and the entry is added to the phrase table. On the other hand, of either or both of the source language or destination side of the pair being entered into the phrase table includes target language, then at step 174 the method call may be discarded so that the proposed entry is not added to the phrase table. Processing may then return to step 168, where the classifier awaits a new phrase table update method call.

Figure 8B:
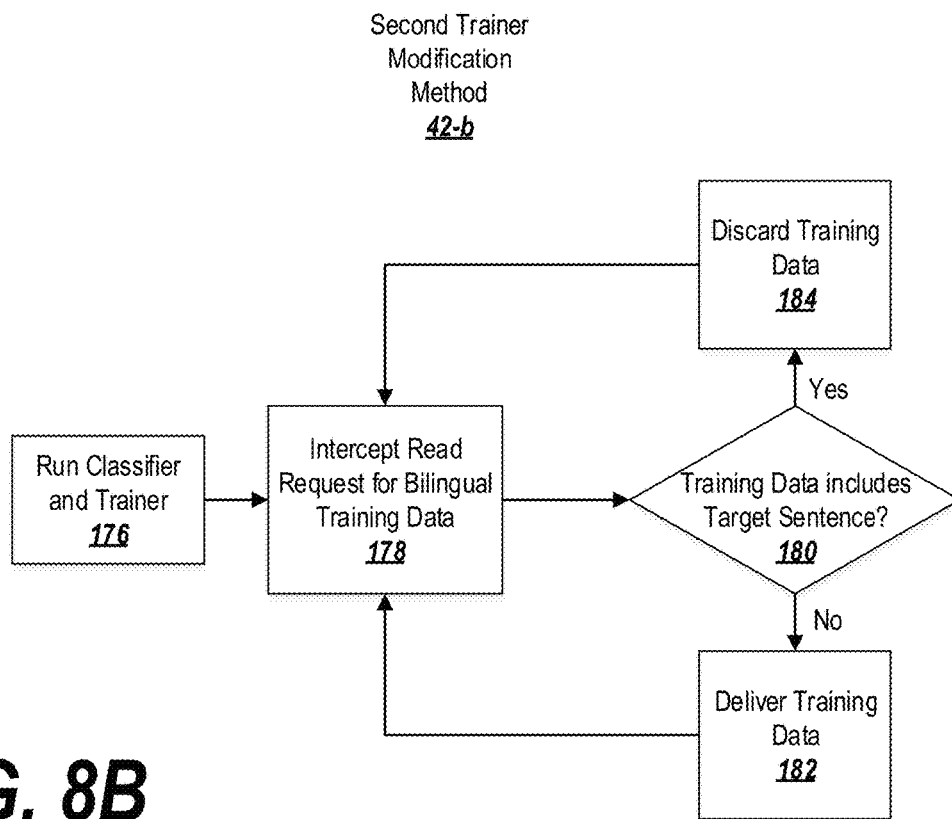

Another example of a method 42-b for modifying the training logic 12 is depicted in FIG. 8B, the second trainer modification method 42-b works by intercepting training data before it is used to train the translation model 14.

The method 42-b begins at step 176, when the classifier 20 and training logic 12 are started. For example, the classifier 20 and training logic 12 may be run in corresponding threads.

At step 178, the classifier 20 may intercept a read request from the training logic 12 for retrieving the next entry from the bilingual training data 10. At this stage, the training logic 12 is attempting to train the translation model 14 with new data, and the classifier 20 may check to determine whether the new data maps non-target language to target language.

Accordingly, at step 180, the classifier 20 may determine whether the training data includes a target word or phrase. For example, the classifier 20 may apply appropriate source vector machines 60 to determine which side of the maximum-margin hyperplane the source language word and/or destination language word falls.

If the new data does not include a target word or phrase, then processing proceeds to step 182 and the training data is delivered to the training logic 12 so that the training logic 12 may use the training data to train the model 14. On the other hand, if either or both of the source language or destination side of the pair retrieved from the bilingual training data 10 includes target language, then at step 184 the method call may be discarded so that the proposed entry is not added to the phrase table. Processing may then return to step 178, where the classifier awaits a new training data read request.

Figure 8C:
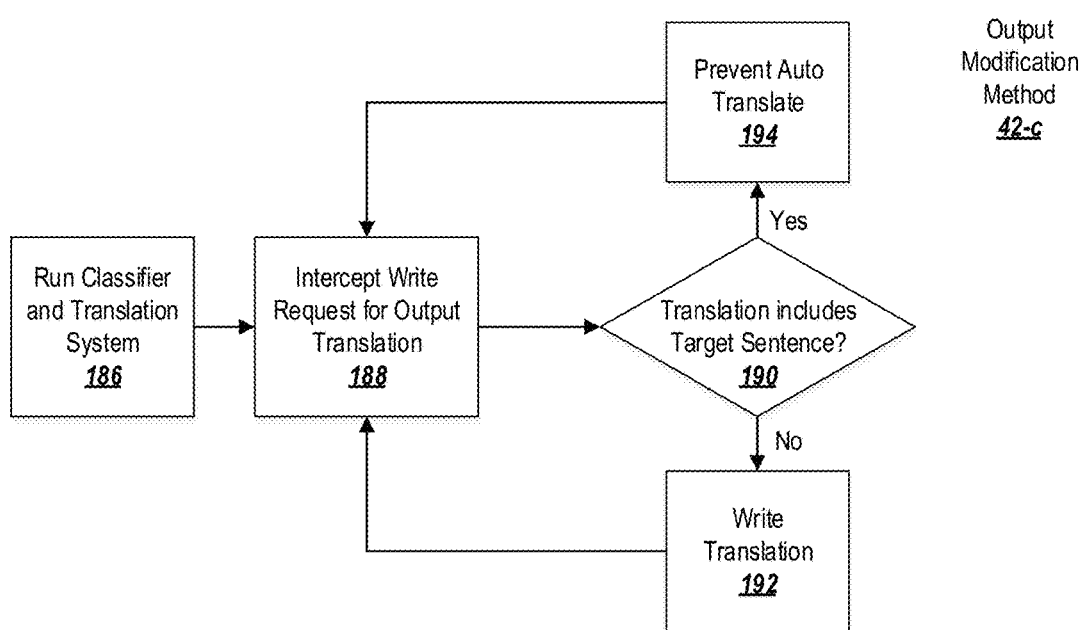

FIG. 8C depicts yet another example in which the output technique of the translation system 16 is modified. The method 42-c begins at step 186, when the classifier 20 and translation system 16 are started. For example, the classifier 20 and translation system 16 may be run in corresponding threads.

At step 188, the classifier 20 may intercept a write request from the translation system 16 for adding new destination language material to an output translation 18. At step 190, the classifier 20 may determine whether the new material being added to the output translation includes a target word or phrase. For example, the classifier 20 may apply appropriate source vector machines 60 to determine which side of the maximum-margin hyperplane the destination language word falls.

If the new data does not include a target word or phrase, then processing proceeds to step 192 and the output material is added to the translation. On the other hand, the destination language material being added includes target language, then at step 194 the output modification method 42-c may take an action to prevent the output translation from being automatically presented. Processing may then return to step 168, where the classifier awaits a new output translation write request.

FIGS. 8A-8C depict specific embodiments in which read and write requests are intercepted by the classifier 20. However, other behavior modifications are also possible. For example, the classifier 20 may replace the method definitions for the translation system 16 in order to effect a change in behavior, or could directly modify the training logic or translation code.

Figure 9:
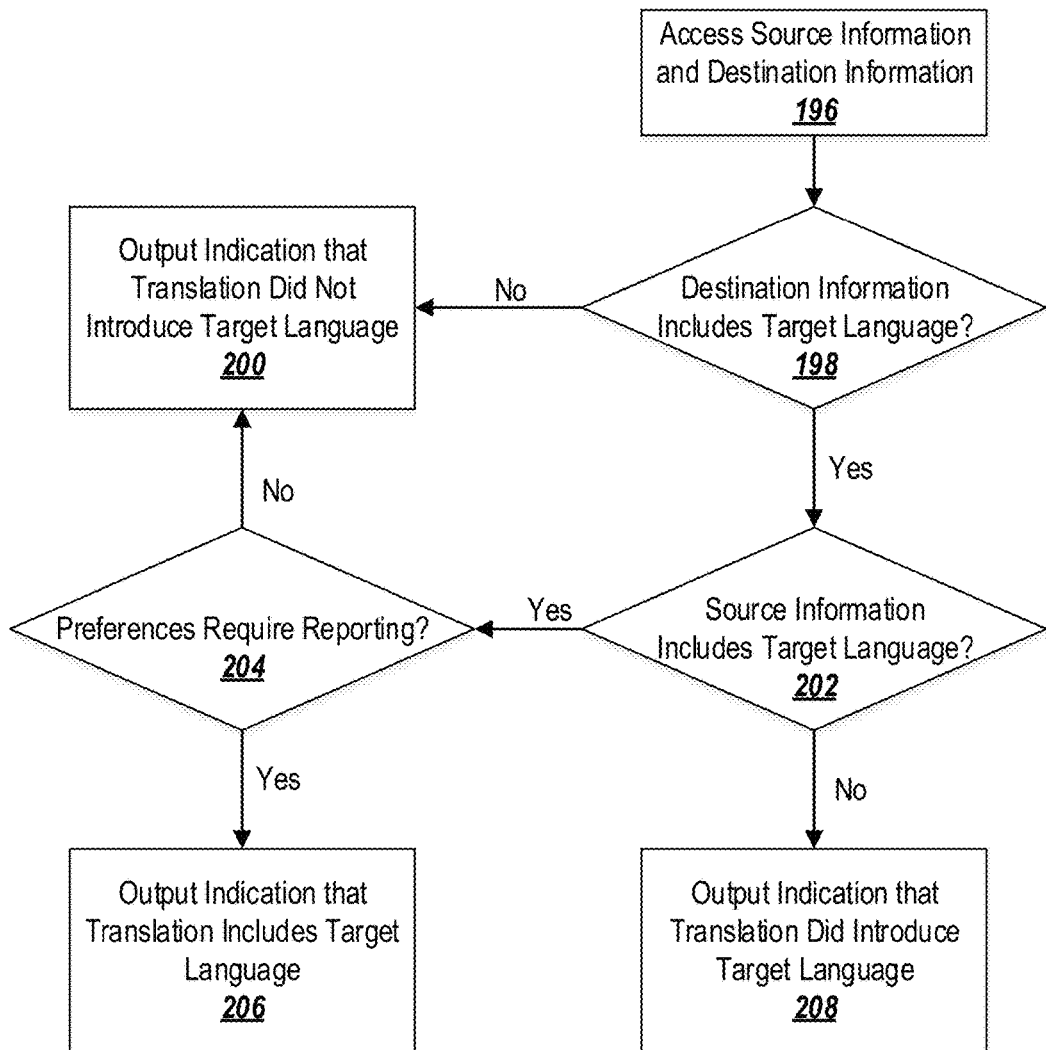
FIG. 9 is a flowchart describing an exemplary method for employing the classifier as a standalone service.

FIGS. 7A-8C describe exemplary ways in which the classifier 20 may be employed as part of a translation system 16. However, the classifier 20 may also be applied as a standalone service, as in the method of FIG. 9.

The method begins at step 196, where the classifier 20 accepts source information and destination information. The information could be, for example, source material and a resulting translation, a third-party phrase table that includes both source words and destination words, or third-party bilingual training data.

At step 198, the classifier 20 determines whether the destination language portion of the information retrieved at step 196 includes target language. For example, the classifier 20 may apply one or more of the above-noted support vector machines 60 corresponding to the destination language and may determine which side of the maximum-margin hyperplane defined by the support vector machine 60 each word/phrase/sentence in the destination information falls. If there is no target language in the destination information, then processing may proceed to step 200 and the classifier 20 may output an indication that the translation of the source information into destination information did/does not introduce target language into the translation.

If, on the other hand, the destination information does include target language, then at step 202 the source information may be evaluated to determine whether the source information includes any target language. If not, then the translation of the source information into destination information did/does introduce target language into the translation. Processing therefore proceeds to step 208 and the classifier outputs an indication that the translation did introduce target language in the destination language.

If the determination at step 202 is "yes" (i.e., both the source information and the destination information includes target language), then processing may proceed to step 204. In this eventuality, the end-user may prefer either to allow the translation to stand, or to flag that both the translation and the original source material included target language. If it is determined at step 204 that the reporting of this information is not required (e.g., by consulting one or more classifier preferences), then processing may proceed to step 200 and the classifier 20 may output an indication that the translation did not introduce target language (although the classifier 20 may optionally indicate that both the source and the destination information did include target language). On the other hand, if the preferences consulted at step 204 do require that the presence of the target language be reported, then processing may proceed to step 206 and the classifier 20 may output an indication that the translation (and/or the source information) includes target language.

Network Embodiments

Figure 10:
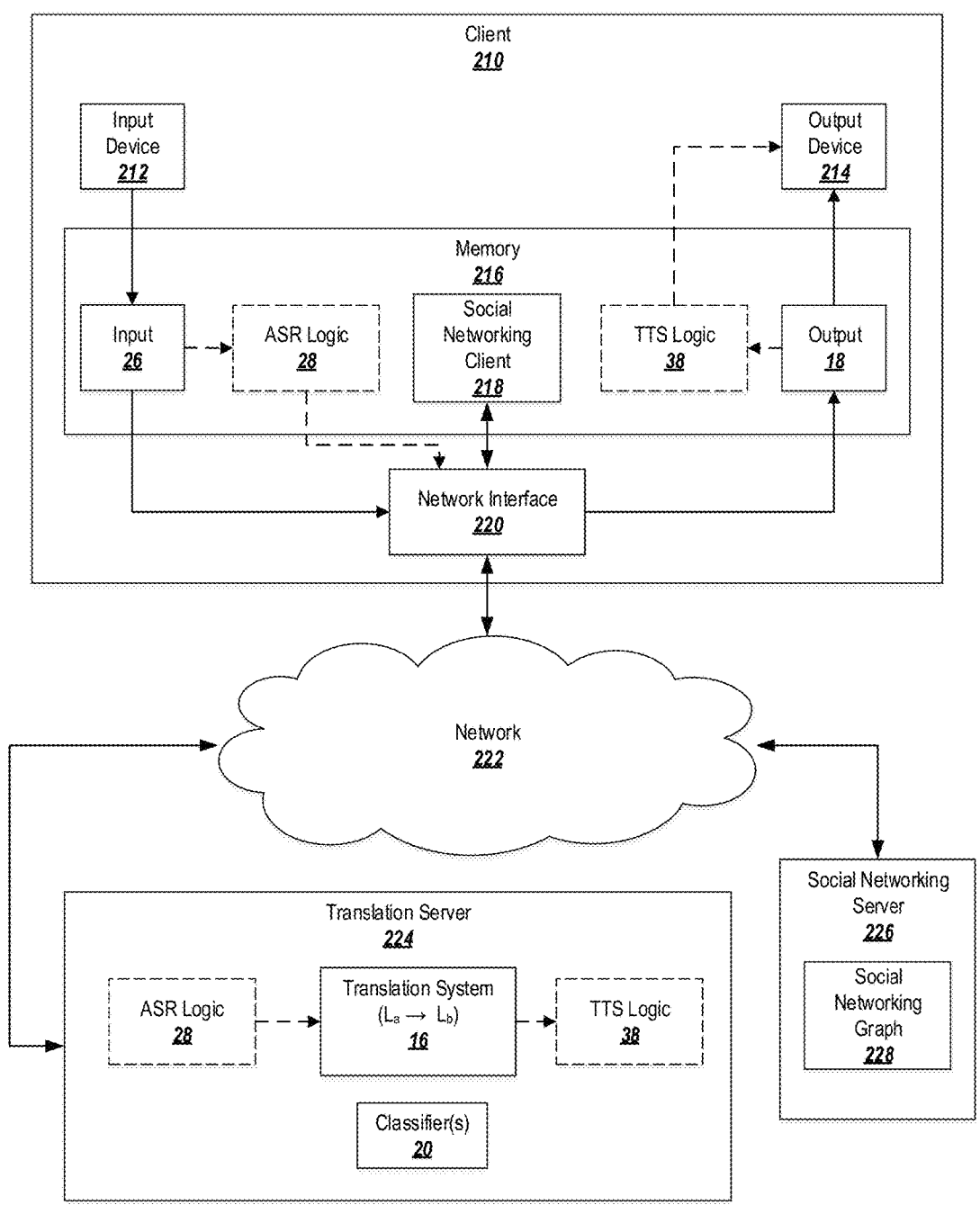
FIG. 10 depicts an exemplary network embodiment.

Some exemplary embodiments may be employed in a network environment, such as the environment depicted in FIG. 10.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input in a source language $L_a$. The output devices 214 may include a speaker, a display device such as a monitor or touch screen, and other devices for presenting an output in a destination language $L_b$.

In some embodiments, the input from the input devices 212 may be in the form of an input 28 that is being sent to a translation system 16 for translation. In other embodiments, the client 201 may also submit training data, a phrase table, a translation, or a translation and the original source data used to generate the translation.

The client 210 may include a memory 216, which may be a non-transitory computer readable storage medium, such as one or a combination of a hard drive, solid state drive, flash storage, read only memory, or random access memory. The memory 216 may a representation of an input 26 and/or a representation of an output 18, as well as one or more applications. For example, the memory 216 may store a social networking client 218 that allows a user to interact with a social networking service.

The input 26 may be textual, such as in the case where the input device 212 is a keyboard. Alternatively, the input 26 may be an audio recording, such as in the case where the input device 212 is a microphone. Accordingly, the input 26 may be subjected to automatic speech recognition (ASR) logic 28 in order to transform the audio recording to text that is processable by the translation system 16. As shown in FIG. 10, the ASR logic 28 may be located at the client device 210 (so that the audio recording is processed locally by the client 210 and corresponding text is transmitted to the translation server 224), or may be located remotely at the translation server 224 (in which case, the audio recording may be transmitted to the translation server 224 and the translation server 224 may process the audio into text). Other combinations are also possible—for example, if the input device 212 is a touch pad or electronic pen, the input 26 may be in the form of handwriting, which may be subjected to handwriting or optical character recognition analysis logic in order to transform the input 26 into processable text.

Similarly, a resulting output 18 from a translation system 16 may be in the form of text. In some embodiments, the desirable end form of the output may be something other than text, such as an audio representation of the translation. Accordingly, the output 18 may be subjected to text-to-speech (TTS) logic 38 in order to transform the text into an audio recording that is presentable by the output devices 214. As shown in FIG. 10, the TTS logic 38 may be located at the client device 210 (so that the output text is processed locally by the client 210 and corresponding audio is sent to the output devices 214), or may be located remotely at the translation server 224 (in which case, text may be processed at the translation server 224 and the resulting audio recording may be transmitted to the client 210). Other combinations of processing logic are also possible, depending on the desired final form for the output 18.

The client 210 may be provided with a network interface 220 for communicating with a network 222, such as the Internet. The network interface 220 may transmit the input 16 in a format and/or using a protocol compatible with the network 222 and may receive a corresponding output 28 from the network 222.

The network interface 220 may communicate through the network 222 to a translation server 224. The translation server 224 may host the above-described translation system 16 and/or a classifier 20. Although FIG. 10 shows the classifier(s) 20 as being separate from the translation system 16, the classifier(s) 20 may also be part of the translation system 16. The translation system 16 may translate the input 26 into an output 18. The classifier 20 may interact with the translation system 16 in order to prevent a translation having target language from being automatically presented by the output devices 214. As described above, the classifier 20 may operate on the output translation, and/or may operate on the translation system 16 in order to either edit the translation or modify the behavior of the translation system 16.

The network interface 220 of the client 210 may also be used to communicate through the network 222 with a social networking server 226. The social networking server 226 may include or may interact with a social networking graph 228 that defines connections in a social network. Furthermore, the translation server 224 may connect to the social networking server 226 for various purposes, such as retrieving training data from the social network. The client 210 may provide the input 36 to, and may receive the output 18 from, the social network (e.g., as a translated post, article, etc.).

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described classifier and/or translation system. Targeting criteria used to identify and target users may include explicit, stated user interests on social-networking server 226 or explicit connections of a user to a node, object, entity, brand, or page on social-networking server 226. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 11:
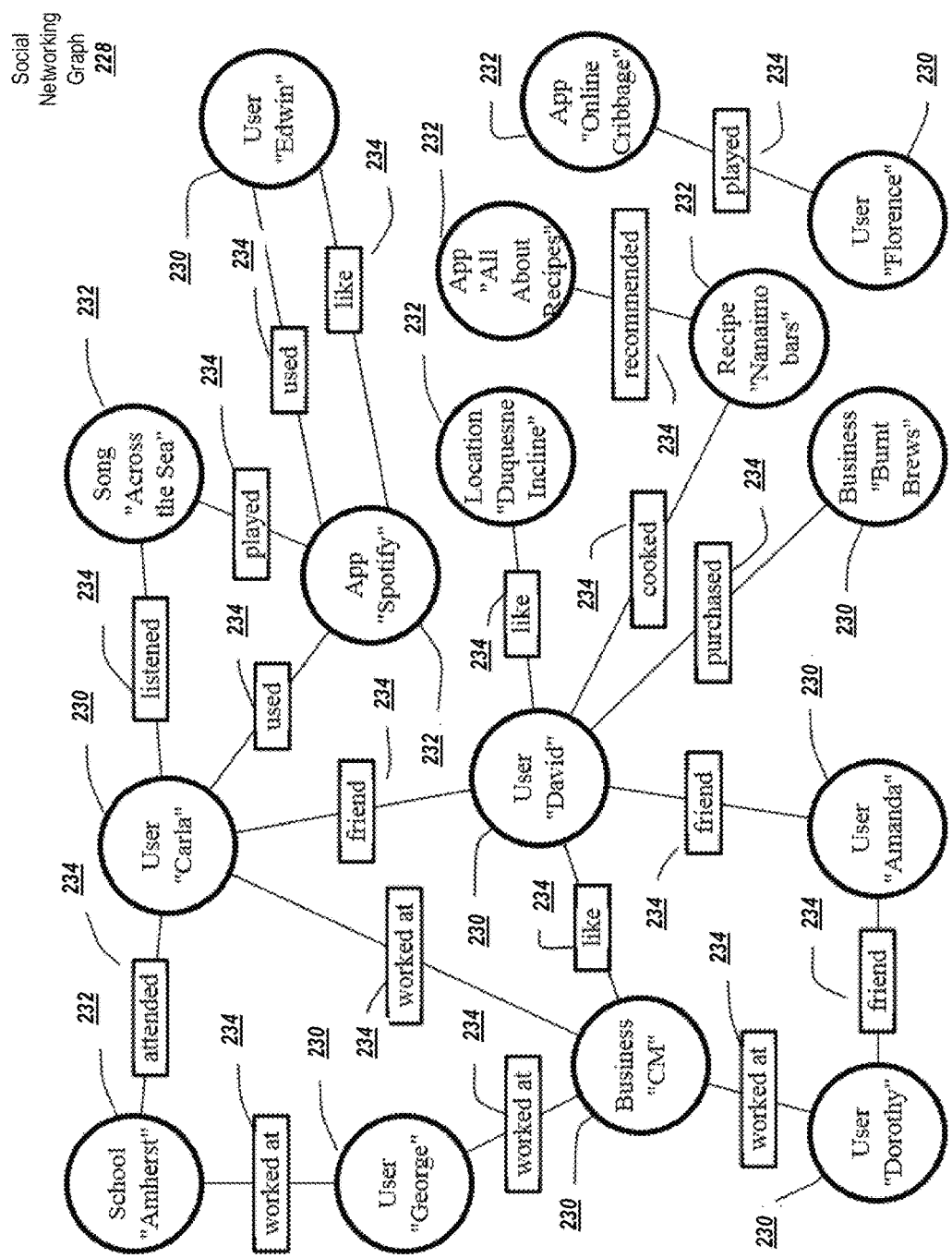
FIG. 11 describes the social networking graph depicted in FIG. 10 in more detail.

FIG. 11 illustrates an example of a social graph 228. In exemplary embodiments, a social-networking service may store one or more social graphs 228 in one or more data stores as a social graph data structure via the social networking service.

The social graph 228 may include multiple nodes, such as user nodes 230 and concept nodes 232. The social graph 228 may furthermore include edges 234 connecting the nodes. The nodes and edges of social graph 228 may be stored as data objects, for example, in a data store (such as a social-graph database). Such a data store may include one or more searchable or queryable indexes of nodes or edges of social graph 228.

The social graph 228 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 228 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system 140 a message indicating the user's action. In response to the message, the social-networking system 140 may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 228 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system 140 may send a "friend request" to the second user. If the second user confirms the "friend request," the social-networking system may create an edge 234 connecting the first user's user node 230 to the second user's user node 230 in social graph 228 and store edge 234 as social-graph information in one or more data stores. In the example of FIG. 11, social graph 228 includes an edge 234 indicating a friend relation between user nodes 230 of user "Amanda" and user "Dorothy." Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 228 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system 140 may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system 140 may create a "listened" edge 234 and a "used" edge (as illustrated in FIG. 2) between user nodes 230 corresponding to the user and concept nodes 232 corresponding to the song and application to indicate that the user listened to the song and used the application. Moreover, the social-networking system 140 may create a "played" edge 234 (as illustrated in FIG. 11) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 11 between user node 230 for user "Edwin" and concept node 232 for "SPOTIFY").

In particular embodiments, the social-networking system 140 may create an edge 234 between a user node 230 and a concept node 232 in social graph 228. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system 140 may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 228 may further comprise a plurality of product nodes. Product nodes may represent particular products that may be associated with a particular business. A business may provide a product catalog to a consumer-to-business service and the consumer-to-business service may therefore represent each of the products within the product in the social graph 228 with each product being in a distinct product node. A product node may comprise information relating to the product, such as pricing information, descriptive information, manufacturer information, availability information, and other relevant information. For example, each of the items on a menu for a restaurant may be represented within the social graph 228 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 228. The information for a product node may be manipulated by the social-networking system as a product object that encapsulates information regarding the referenced product.

As such, the social graph 228 may be used to infer shared interests, shared experiences, or other shared or common attributes of two or more users of a social-networking system. For instance, two or more users each having an edge to a common business, product, media item, institution, or other entity represented in the social graph 228 may indicate a shared relationship with that entity, which may be used to suggest customization of a use of a social-networking system, including a messaging system, for one or more users.

Computer-Related Embodiments

Figure 12:
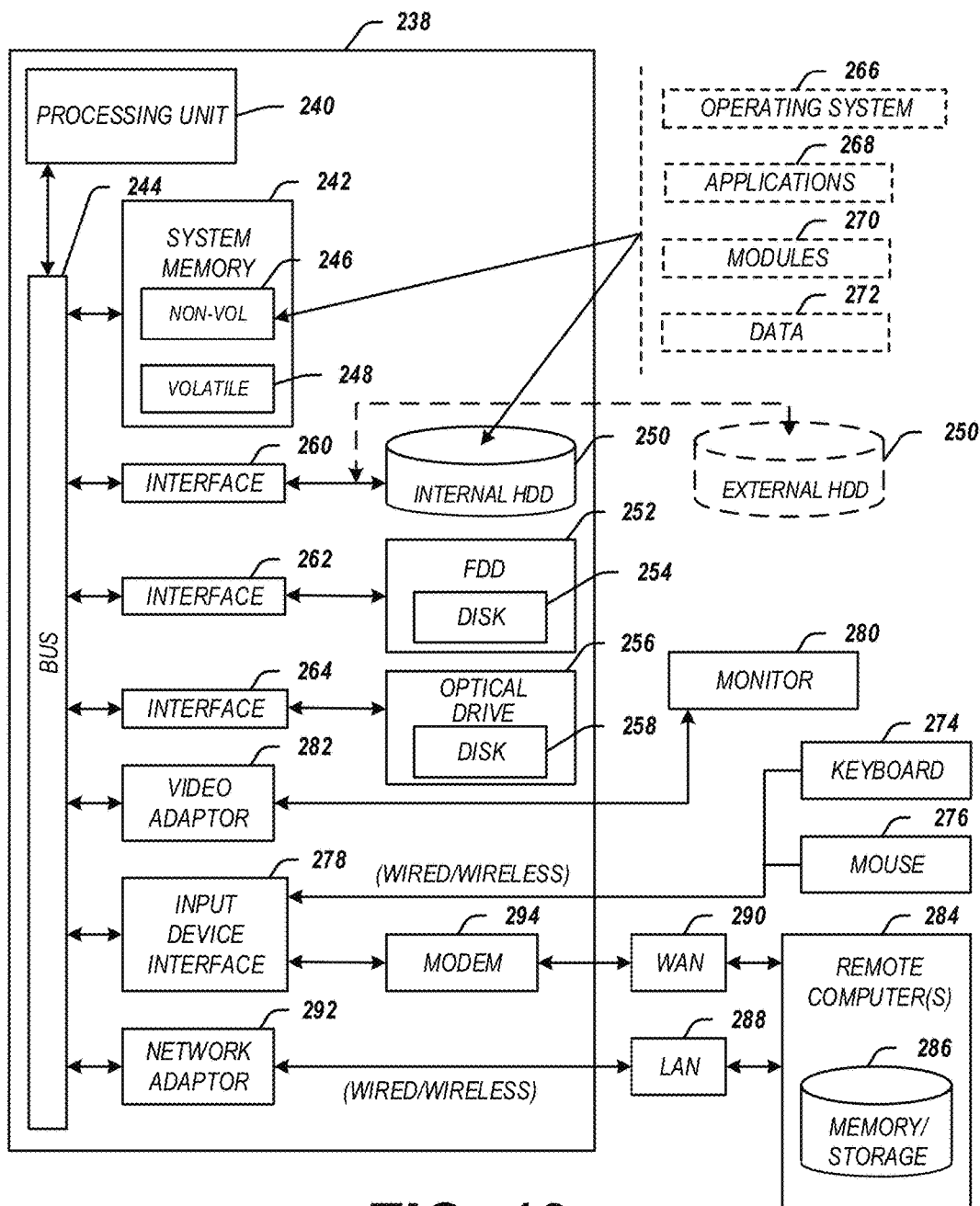
FIG. 12 depicts an exemplary computing device suitable for use with exemplary embodiments.

The above-described methods may be embodied as instructions on a computer readable medium or as part of a computing architecture. FIG. 12 illustrates an embodiment of an exemplary computing architecture 236 suitable for implementing various embodiments as previously described. In one embodiment, the computing architecture 236 may comprise or be implemented as part of an electronic device. Examples of an electronic device may include those described with reference to FIG. 12, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 12, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292. The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
    translating, by a machine translation system, an input in a source language to an output in a destination language;
    analyzing, by a classifier, information associated with at least one of the machine translation system or the output to determine that the output of the machine translation system comprises one or more target words or phrases, the classifier mathematically dividing target words or phrases and non-target words or phrases; and
    automatically modifying the machine translation system so that the one or more target words or phrases are not automatically presented to an output device, wherein the modifying comprises modifying, by the classifier, to filter the bilingual training data that trains the machine translation system, the training data comprising pairs of words or phrases in the source language and the destination language, the training data filtered to remove pairs in which the destination word or phrase is a target word or phrase.

2. The method of claim 1, wherein analyzing the information comprises determining whether the machine translation system is capable of producing a translation that includes the one or more target words or phrases from source information that lacks one or more corresponding target words or phrases.

3. The method of claim 1, wherein the modifying comprises filtering a trained phrase table that the machine translation system uses to translate the source language into the destination language.

4. The method of claim 1, wherein the modifying further comprises at least one of removing the target words or phrases from the output, replacing the target words or phrases in the output with non-target words or phrases, or obscuring the target words or phrases in the output.

5. The method of claim 1, wherein the modifying further comprises adjusting training logic that trains the machine translation system to translate the source language into the destination language.

6. The method of claim 1, wherein the modifying comprises:
preventing the machine translation system from automatically displaying the output on a display;
presenting a prompt that allows the output to be displayed; and
in response to receiving an indication that the output should be displayed from the prompt, displaying the output on the display.

7. A non-transitory computer-readable medium storing instructions that, when executed by one or more processors, cause the one or more processors to:
translating, by a machine translation system, an input in a source language to an output in a destination language;
analyze, by a classifier, information associated with at least one of the machine translation system or the output to determine that the output of the machine translation system comprises one or more target words or phrases, the classifier mathematically dividing target words or phrases and non-target words or phrases; and
automatically modify the machine translation system so that the one or more target words or phrases are not automatically presented to an output device, wherein the modifying comprises modifying, by the classifier, to filter a trained phrase table that the machine translation system uses to translate the source language into the destination language, the trained phrase table comprising pairs of words or phrases in the source language and the destination language, the trained phrase table filtered to remove pairs in which the destination word or phrase is a target word or phrase.

8. The medium of claim 7, wherein analyzing the information comprises determining whether the machine translation system is capable of producing a translation that includes the one or more target words or phrases from source information that lacks one or more corresponding target words or phrases.

9. The medium of claim 7, wherein the modifying further comprises at least one of removing the target words or phrases from the output, replacing the target words or phrases in the output with non-target words or phrases, or obscuring the target words or phrases in the output.

10. The medium of claim 7, wherein the modifying further comprises adjusting training logic that trains the machine translation system to translate the source language into the destination language.

11. The medium of claim 7, wherein the modifying comprises:
preventing the machine translation system from automatically displaying the output on a display;
presenting a prompt that allows the output to be displayed; and
in response to receiving an indication that the output should be displayed from the prompt, displaying the output on the display.

12. An apparatus comprising:
a non-transitory computer readable medium storing logic for a machine translation system configured to translate an input in a source language to an output in a destination language;
a classifier configured to analyze information associated with at least one of the machine translation system or the output to determine that the output of the machine translation system comprises one or more target words or phrases, the classifier mathematically dividing target words or phrases and non-target words or phrases; and
a processor configured to automatically modify, by classifier, the machine translation system so that the one or more target words or phrases are not automatically presented to an output device, wherein the modifying comprises: filtering, by classifier, bilingual training data that trains the machine translation system or filtering, by classifier, a trained phrase table that the machine translation system uses to translate the source language into the destination language, the filtering removing references to target words or phrases.

13. The apparatus of claim 12, wherein analyzing the information comprises determining whether the machine translation system is capable of producing a translation that includes the one or more target words or phrases from source information that lacks one or more corresponding target words or phrases.

14. The apparatus of claim 12, wherein the modifying further comprises at least one of removing the target words or phrases from the output, replacing the target words or phrases in the output with non-target words or phrases, or obscuring the target words or phrases in the output.

15. The apparatus of claim 12, wherein the modifying further comprises:
preventing the machine translation system from automatically displaying the output on a display;
presenting a prompt that allows the output to be displayed; and
in response to receiving an indication that the output should be displayed from the prompt, displaying the output on the display.

16. The method of claim 1 wherein the classifier mathematically divides target words or phrases and non-target words or phrases using a maximum-margin hyperplane.

17. The computer-readable storage medium of claim 7 wherein the classifier mathematically divides target words or phrases and non-target words or phrases using a maximum-margin hyperplane.

18. The apparatus of claim 12 wherein the classifier mathematically divides target words or phrases and non-target words or phrases using a maximum-margin hyperplane.

* * * * *